US008469806B2

(12) United States Patent
Grant et al.

(10) Patent No.: US 8,469,806 B2
(45) Date of Patent: Jun. 25, 2013

(54) SYSTEM AND METHOD FOR PROVIDING COMPLEX HAPTIC STIMULATION DURING INPUT OF CONTROL GESTURES, AND RELATING TO CONTROL OF VIRTUAL EQUIPMENT

(75) Inventors: Danny A. Grant, Laval (CA); Robert W. Heubel, San Leandro, CA (US); David M. Birnbaum, Oakland, CA (US); Erin B. Ramsay, Montreal (CA)

(73) Assignee: Immersion Corporation, San Jose, CA (US)

( * ) Notice: Subject to any disclaimer, the term of this patent is extended or adjusted under 35 U.S.C. 154(b) by 271 days.

(21) Appl. No.: 12/840,797

(22) Filed: Jul. 21, 2010

(65) Prior Publication Data

US 2011/0021272 A1    Jan. 27, 2011

Related U.S. Application Data

(60) Provisional application No. 61/227,645, filed on Jul. 22, 2009.

(51) Int. Cl.
*A63F 9/24* (2006.01)
(52) U.S. Cl.
USPC .............................................. 463/30; 463/22
(58) Field of Classification Search
USPC ...................................................... 463/30, 22
See application file for complete search history.

(56) References Cited

U.S. PATENT DOCUMENTS

| 2005/0212760 | A1 | 9/2005 | Marvit et al. |
| 2005/0245302 | A1 | 11/2005 | Bathiche et al. |
| 2007/0150826 | A1 | 6/2007 | Anzures et al. |
| 2007/0265096 | A1 | 11/2007 | Kouno et al. |
| 2007/0279392 | A1 | 12/2007 | Rosenberg et al. |
| 2008/0024459 | A1 | 1/2008 | Poupyrev et al. |
| 2011/0050601 | A1* | 3/2011 | Son et al. ...................... 345/173 |

FOREIGN PATENT DOCUMENTS

| WO | WO 99/38064 | 7/1999 |
| WO | WO 2009/071750 | 6/2009 |

OTHER PUBLICATIONS

International Search Report as issued for International Application No. PCT/US2010/042795, dated Jan. 12, 2011.
International Preliminary Report on Patentability, including the Written Opinion, as issued for International Application No. PCT/US2010/042795, dated Feb. 2, 2012.
International Search Report as issued for International Application No. PCT/US2010/042805, dated Oct. 29, 2010.
International Preliminary Report on Patentability, including the Written Opinion, as issued for International Application No. PCT/US2010/042805, dated Feb. 2, 2012.

* cited by examiner

*Primary Examiner* — Pierre E Elisca
(74) *Attorney, Agent, or Firm* — Pillsbury Winthrop Shaw Pittman LLP

(57) ABSTRACT

A system is configured to provide haptic stimulation to a user. In one embodiment, the haptic stimulation is provided to the user in conjunction with the performance of one or more control gestures through which the user controls, for example, a game, a real world component or piece of equipment, and/or other entity. In one embodiment, the haptic stimulation is provided to the user in conjunction with control of virtual equipment by the user.

40 Claims, 13 Drawing Sheets

SYSTEM AND METHOD FOR PROVIDING COMPLEX HAPTIC STIMULATION DURING INPUT OF CONTROL GESTURES, AND RELATING TO CONTROL OF VIRTUAL EQUIPMENT

RELATED APPLICATIONS

This application claims priority from U.S. Provisional Patent Application No. 61/227,645, filed Jul. 22, 2009, and entitled "Interactive Touch Screen Gaming Metaphors With Haptic Feedback. The U.S. Provisional Patent Application No. 61/227,645 is hereby incorporated by reference in its entirety into the present application.

FIELD OF THE INVENTION

The invention relates to a system and method of providing haptic stimulation to a user during performance of a complex control gesture, and/or during the control of virtual equipment.

BACKGROUND OF THE INVENTION

Provision of haptic stimulation to users is known. Haptic stimulation provide a physical sensation to users. Haptic stimulation is used in the context of games, and virtual worlds, and in real world control systems. Such haptic stimulation may be generated to provide feedback to users that a control input has been received, that another user has input a command, that virtual or real objects have collided, exploded, or imploded, that an ambient force is present (e.g., simulated or real wind, rain, magnetism, and/or other virtual forces), and/or that other phenomena have occurred. In conventional systems, the parameters of such stimulation is typically static and provides a simple mechanism for instructing a user that a corresponding phenomena has occurred (or will occur).

Conventional game and/or virtual world systems that enable a user to control virtual equipment are known. The control and feedback schemes for interacting with virtual equipment in these conventional systems tend to be limited, and to not correlate strongly with real world control and/or feedback of corresponding real world equipment.

Although basic haptic effects (e.g., vibrate) have been used in mobile and other computing devices, numerous challenges remain for developers to engage users and provide feedback to enhance the user experience

SUMMARY

One aspect of the invention relates to a system configured to provide haptic stimulation to a user of a game. In one embodiment, the system comprises a user interface, an actuator, and one or more processors configured to execute computer program modules. The user interface is configured to generate output signals related to the gestures of a user. The actuator is configured to generate haptic stimulation to the user. The computer program modules comprise a gesture module, a stimulation module and an actuator control module. The gesture module is configured to monitor performance of a control gesture by the user based on the output signals of the user interface. The control gesture is a gesture associated with a command input to the game, and includes an initial portion, a first intermediate portion, and an ending portion. The stimulation module is configured to receive information related to performance of the control gesture from the gesture module, and to determine haptic stimulation to be generated for the user associated with the control gesture. The haptic stimulation includes a first stimulation determined responsive to performance of the initial portion of the control gesture, and a second stimulation that is different from the first stimulation and is determined responsive to performance of the first intermediate portion of the control gesture. The actuator control module is configured to control the actuator to generate the stimulation determined by the stimulation module.

Another aspect of the invention relates to a method of providing haptic stimulation to a user of a game. In one embodiment, the method comprises monitoring performance of a control gesture by a user, wherein the control gesture is a gesture associated with a command input to the game, and includes an initial portion, a first intermediate portion, and an ending portion; determining haptic stimulation associated with performance of the control gesture to be generated for the user, wherein the haptic stimulation includes a first stimulation determined responsive to performance of the initial portion of the control gesture, and a second stimulation that is different from the first stimulation and is determined responsive to performance of the first intermediate portion of the control gesture; and generating the determined stimulation during performance of the control gesture.

Yet another aspect of the invention relates to a system configured to provide stimulation to a user of a game. In one embodiment, the system comprises a touch sensitive electronic display, an actuator, and one or more processors configured to execute computer program modules. The touch sensitive electronic display has an interface surface that is accessible for engagement by the user, and the touch sensitive user interface is configured to generate output signals related to the position at which the interface surface is engaged, and to present views of the game to the user through the interface surface. The views presented through the interface surface include views of virtual equipment having user selectable sections that are selectable by the user to interact with the virtual equipment by engaging the interface surface at the user selectable sections of the views of the virtual equipment. The actuator is configured to generate haptic stimulation to the user. The computer program modules comprise an equipment module, a stimulation module, and an actuator control module. The equipment module is configured to determine the operating parameters of the virtual equipment in the views, and to simulate operation of the virtual equipment. The equipment module determines the operating parameters of the virtual equipment and/or simulates operation of the virtual equipment based on selections by the user of the user selectable sections of the views of the virtual equipment. The stimulation module is configured to determine haptic stimulation to be generated for the user associated with the operating parameters of the virtual equipment and/or simulated operation of the virtual equipment. The actuator control module is configured to control the actuator to generate the stimulation determined by the stimulation module.

Still another aspect of the invention relates to a method of providing stimulation to a user of a game. In one embodiment, the method comprises presenting views of a game through an interface surface of a touch sensitive electronic display that is accessible for engagement by a user, wherein the views presented through the interface surface include views of virtual equipment having user selectable sections that are selectable by the user to interact with the virtual equipment by engaging the interface surface at the user selectable sections of the views of the virtual equipment; receiving selection of one of the user selectable sections via an by the user engagement of the selected user selectable section on the interface surface;

determining the operating parameters of the virtual equipment in the views and/or simulating operation of the virtual equipment based on the received selection; determining, responsive to the received selection, haptic stimulation to be generated for the user associated with the operating parameters of the virtual equipment and/or simulated operation of the virtual equipment; and generating the determined haptic stimulation.

A still further aspect of the invention relates to a system and method for providing a game on one or more portable computing device in which a virtual object (e.g., a ball) travels through views of the game displayed on the interfaces of the one or more portable computing devices. Haptic effects corresponding to the travel of the virtual object (or virtual objects) through the views are provided on the individual portable computing devices. The haptic effects may be determined based on one or more parameters of the travel of the virtual object (e.g., speed, direction, acceleration, etc.), one or more parameters of objects and/or features with which the virtual object interacts (e.g., walls, flippers, blockers, bumpers, etc.), and/or other parameters. The haptic effects may include haptic effects to be provided on portable computing devices that are not currently displaying the virtual object corresponding to the haptic effects. This may enhance the interactivity of the game for a group of users playing the game together on separate portable computing devices.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
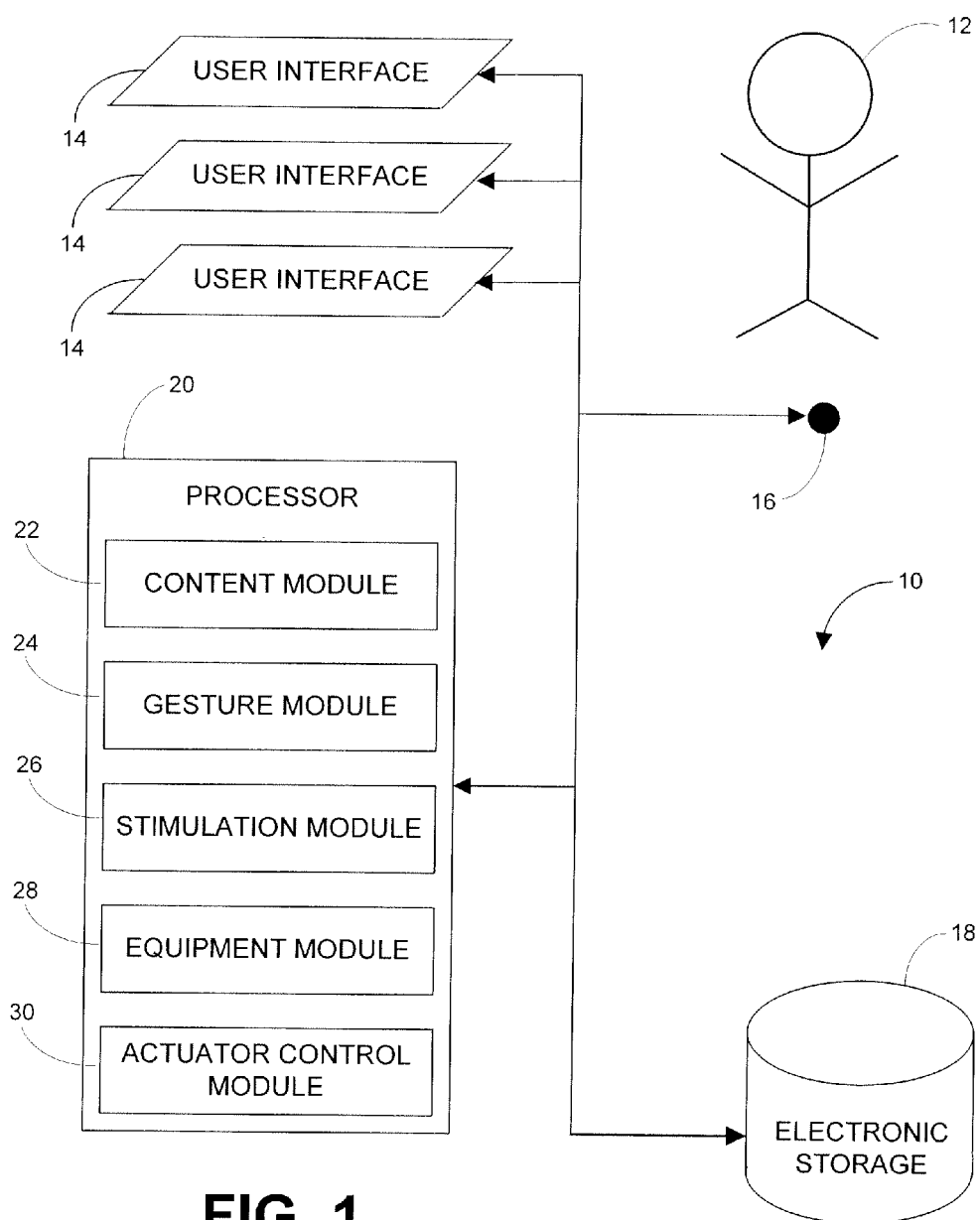
FIG. 1 illustrates a system configured to provide haptic stimulation to a user, in accordance with one or more embodiments of the invention.

FIG. 1 illustrates a system 10 configured to provide haptic stimulation to a user 12. In one embodiment, the haptic stimulation is provided to user 12 in conjunction with the performance of one or more control gestures through which user 12 controls, for example, a game, a real world component or piece of equipment, and/or other entity. The haptic stimulation is provided to user 12 such that as performance of a given control gesture continues, the haptic stimulation associated with the control gesture changes in accordance with the progression of the control gesture. In one embodiment, the haptic stimulation is provided to user 12 in conjunction with control of virtual equipment by user 12. The haptic stimulation corresponds to control inputs provided to system 10 in controlling the virtual equipment. In one embodiment, system 10 includes one or more user interfaces 14, one or more actuators 16, electronic storage 18, one or more processors 20, and/or other components.

Although this disclosure primarily describes the provision of haptic stimulation in conjunction with control gestures performed to control a game, this is not limiting. The provision of haptic stimulation in accordance with the principles set forth herein may be extended to other contexts in which a user provides input in the form of a control gesture (e.g., controlling a television, a computer, an automobile, a remote control vehicle or vessel, etc.). In implementations involving the control of real world components or systems, haptic stimulation may be used to enhance the performance of complex control gestures by users, enhance the user experience, teach users to perform control gestures, and/or provide other enhancement over conventional real world control systems. Implementations involving control of real world components or systems may include instances in which a user is present at the component being controlled (e.g., a control panel in a car, on a microwave, etc.), and/or instances in which a user is located remotely from the component being controlled. Control of a remote real world component or system may be accompanied by other sensory stimulation informing the user of the state of the component being controlled. Such other sensory stimulation may include, for example, real-time (or near real-time) video, audio, and/or still images provided to the user.

Several embodiments are described herein as though user 12 were the only user for whom haptic stimulus is being provided. This is not limiting. Expansion of the principles and embodiments described herein is within the ability of one of ordinary skill in the art, and the description of a single user embodiment would enable the person of ordinary skill in the art to make and/or user a multiple user embodiment providing the same features to a plurality of users. A multiple user embodiment may include the provision of haptic stimulation to "passive users" (e.g., users not performing a control gesture) related to the performance of a control gesture by an "active user" (e.g., the user performing the control gesture). The haptic stimulation may further provide feedback to the passive and/or active users of other phenomena present in the multi-user environment.

As used herein, a "control gesture" refers to a gesture made by a user that is a single and discrete control input having separate portions. The separate portions must be performed in specific order and/or with a specific timing to effectively achieve the control input associated with the "control gesture." Performance of the separate portions, on their own, will not result in the control input associated with the "control gesture" as a whole (e.g., a "control gesture" is not merely a combination of other gestures, each associated with its own control input). In some examples, a "control gesture" is an abstract gesture that does not correlate with exactness to the control input to which it corresponds. Some non-limiting examples of a "control gesture" are described below.

The user interface 14 includes one or more input and/or output devices configured to communicate information to and/or receive information from user 12. The user interface 14 may include, for example, one or more content delivery devices that convey content to user 12. This content may include audio content, video content, still images, and/or other content. The content delivery devices may include, for example, electronic displays (e.g., including touch-sensitive displays), audio speakers, and/or other content delivery devices. The user interface 14 may include one or more control input devices configured to generate an output signal indicating input from the user to system 10. For example, user interface 14 may include a game controller, a remote control, a keypad, a button, a switch, a keyboard, a knob, a lever, a microphone, a position detecting device (e.g., an image sensor, a pressure sensor, an optical position detector, an ultrasonic position detector, a touch sensitive surface, and/or other position detecting devices), an accelerometer, a gyroscope, a digital compass, and/or other control input devices. The user interface 14 may be embodied in, or associated with, a computing device, and/or may be embodied in a control peripheral. A computing device may include one or more of a desktop computer, a laptop computer, a handheld computer, a personal digital assistant, a Smartphone, a personal music player, a portable gaming console, a gaming console, and/or other computing devices.

It will be appreciated that although user interface 14 is shown in FIG. 1 as a single entity, this is for illustrative purposes only. In one embodiment, user interface 14 includes a plurality of actuators. The plurality of user interfaces 14 may be included in, carried by, and/or in contact with a single object or device. Or, the plurality of user interfaces 14 may include user interfaces included in and/or carried by a plurality of separate objects or devices.

The actuators 16 are configured to generate haptic stimulus for user 12. As such, at least some of actuators 16 are in contact with the users, or in contact with objects that contact the users, during conveyance of the sensory content to the users by user interface 14. By way of non-limiting example, one or more of actuators 16 may be positioned in or on a floor surface supporting the users (e.g., installed in the floor, carried by a mat lying on the floor, etc.), one or more of actuators 16 may be carried by a brace or other wearable item worn by the users, one or more of the actuators 16 may be carried by objects that are carried by the users (e.g., carried by a controller), one or more of actuators 16 may be carried by furniture on which the users are seated or lying, one or more of actuators 16 may be carried by user interface 14, and/or one or more of the actuators 16 may be carried by or disposed in or on other objects that contact the users.

As used herein, the term "haptic stimulus" refers to tactile feedback that is applied to the users. For example, such feedback may include one or more of vibrations, forces, and/or motions that are applied physically to the user by the actuators 16 and/or the objects with which both actuators 16 and the user are in contact. The actuators 16 may include any device configured to generate such feedback for application to the users. For example, actuators 16 may include one or more of a piezoelectric actuator, a pneumatic actuator, a central mass actuator, an electroactive polymer actuator, an electrostatic surface actuator, macro-fiber composite actuator, and/or other actuators. For example, a touch sensitive surface (and/or other surfaces) may be actuated to move relative to a user by an electrostatic actuator. The surface actuated by actuators 16 may be rigid, semi-rigid, flexible, and/or deformable.

It will be appreciated that although actuators 16 are shown in FIG. 1 as a single entity, this is for illustrative purposes only. In one embodiment, actuators 16 include a plurality of actuators. The plurality of actuators may be included in, carried by, and/or in contact with a single object or device. Or, the plurality of actuators may include actuators included in, carried by, and/or in contact with a plurality of separate objects or devices.

In one embodiment, electronic storage 18 comprises electronic storage media that electronically stores information. The electronic storage media of electronic storage 18 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 20, information received via user interface 14, and/or other information that enables system 10 to function properly. Electronic storage 18 may be a separate component within system 10, or electronic storage 18 may be provided integrally with one or more other components of system 10 (e.g., processor 20).

Processor 20 is configured to provide information processing capabilities in system 10. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination.

As is shown in FIG. 1, processor 20 may be configured to execute one or more computer program modules. The one or more computer program modules may include one or more of a content module 22, a gesture module 24, a stimulation module 26, an equipment module 28, an actuator control module 30, and/or other modules. Processor 20 may be configured to execute modules 22, 24, 26, 28, and/or 30 by software; hardware; firmware; some combination of software, hardware, and/or firmware; and/or other mechanisms for configuring processing capabilities on processor 20.

It should be appreciated that although modules 22, 24, 26, 28, and 30 are illustrated in FIG. 1 as being co-located within a single processing unit, in implementations in which processor 20 includes multiple processing units, one or more of modules 22, 24, 26, 28, and/or 30 may be located remotely from the other modules. The description of the functionality provided by the different modules 22, 24, 26, 28, and/or 30 described below is for illustrative purposes, and is not intended to be limiting, as any of modules 22, 24, 26, 28, and/or 30 may provide more or less functionality than is described. For example, one or more of modules 22, 24, 26, 28, and/or 30 may be eliminated, and some or all of its functionality may be provided by other ones of modules 22, 24, 26, 28, and/or 30. As another example, processor 38 may be configured to execute one or more additional modules that may perform some or all of the functionality attributed below to one of modules 22, 24, 26, 28, and/or 30.

The content module 22 is configured to control the provision of content to user 12 via user interface 14. If the content includes computer generated images (e.g., in a game, virtual world, simulation, etc.), content module 22 is configured to generate the images and/or views for display to user 12 through user interface 14. If the content includes video and/or still images, content module 22 is configured to access the video and/or still images and to generate views of the video and/or still images for display on user interface 14. If the content includes audio content, content module 22 is configured to generate the electronic signals that will drive user interface 14 to output the appropriate sounds. The content, or information from which the content is derived, may be obtained by content module 22 from electronic storage 18.

In one embodiment, the content provided by content module 22 is content associated with a game. In this embodiment content module 22 is configured to render views of the game for display to user 12 via user interface 14. The content module 22 further provides audio associated with the views in accordance with the machine readable-program code associated with the game.

The gesture module 24 is configured to receive one or more output signals generated by user interface 14 indicating control inputs received from user 12. Based on the received one or more output signals, gesture module 24 monitors performance of one or more control gestures by user 12. In one embodiment, a control gesture being monitored by gesture module 24 includes an initial portion, one or more intermediate portions, and an ending portion.

In an embodiment in which user interface 14 includes a touch-sensitive surface through which input is received from user 12, an initial portion of a control gesture may include initiating contact with the touch-sensitive surface at one or more locations. The control gesture may dictate a location (or locations for a multi-touch control gesture) at which contact is initiated, a pressure with which contact is initiated, and/or other parameters of the initial contact between user 12 and the touch sensitive surface. If user 12 is already in contact with the touch-sensitive surface, the initial portion of the control gesture may include moving to one or more locations corresponding to the control gesture, maintaining contact (at specific location(s), or generally) with the touch-sensitive surface, motioning in one or more specific directions, making one or more specific shapes, ending contact at one or more locations on the touch-sensitive surface, and/or other actions. The one or more intermediate portions of the control gesture may include one or more of maintaining contact at one or more points without moving, motioning in a specific direction, making a specific shape, halting motion, contacting the touch-sensitive surface at one or more additional locations, ending contact at one or more locations on the touch-sensitive surface, pressing harder or softer on the touch-sensitive surface, and/or other actions. The ending portion may include one or more of ending contact at one or more locations on the touch-sensitive surface, halting motion at one or more locations, motioning in a specific direction, making a specific shape, contacting the touch-sensitive surface at one or more additional locations, pressing harder or softer on the touch-sensitive surface, and/or other actions.

One or more of the actions dictated by the initial portion, the one or more intermediate portions, and/or the ending portion of the control gesture that are location-based may be associated with static locations (e.g., at the same location every time), dynamic locations that do not change during the corresponding portion (e.g., the location may move between performances of the control gesture, but remains fixed while the portion corresponding to the location is performed), dynamic locations that change during the corresponding portion, and/or other types of locations.

In the embodiment in which user interface 14 includes a touch-sensitive surface, one of the most simple examples of a control gesture would include an initial portion of in which user 12 contacts the touch-sensitive surface. The intermediate portion may include holding the contact made during the initial portion of the control gesture. The ending portion may include removing the contact made during the initial portion of the control gesture, and maintained during the intermediate portion of the control gesture.

In an embodiment in which user interface 14 includes one or more sensors configured to monitor motion of user 12 in space (e.g., an imaging sensor, a pressure sensor, an accelerometer, and/or other sensors), an initial portion of a control gesture may include one or more of facing a specific direction, motioning or moving in a specific direction, motioning with a specific one or more appendages, positioning body parts with respect to each other in a specific manner (e.g., holding hands in a predetermined configuration, and/or other configurations of body parts), motioning or moving in a specific shape, motioning for a specific amount of time, motioning or moving at (or above, or below) a specific rate and/or acceleration), changing a direction of motion or movement in a specific manner, and/or other actions. The one or more intermediate portions may include one or more of changing orientation of the head, and/or other body parts to a specific direction, motioning or moving in a specific direction, motioning with a specific one or more appendages, motioning with body parts to move in a specific relationship to each other, motioning or moving in a specific shape, motioning for a specific amount of time, motioning or moving at (or above, or below) a specific rate and/or acceleration), changing a direction of motion or movement in a specific manner, halting motion or movement by one or more body parts, and/or other actions. The ending portion of the control gesture may include may include one or more of changing orientation of the head, and/or other body parts to a specific direction, motioning or moving in a specific direction, motioning with a specific one or more appendages, motioning with body parts to move in a specific relationship to each other, motioning or moving in a specific shape, motioning for a specific amount of time, motioning or moving at (or above, or below) a specific rate and/or acceleration), changing a direction of motion or movement in a specific manner, halting motion or movement by one or more body parts, and/or other actions.

The gesture module 24 is configured to monitor performance of the control gestures by obtaining the output signal of user interface 14 indicating movement and/or motion of user 12, and comparing the movement and/or motion of user 12 with the control gestures. One or more of the control gestures may be a function of the content being conveyed to user 12 via user interface 14 by content module 22. For example, one or more of the control gestures may be a function of a game being conveyed to user 12 via user interface 14. One or more of the control gestures may be independent from the content being provided to user 12 via user interface 14. For example, one or more of the control gestures may control function of user interface 14, processor 20, and/or other components.

The stimulation module 26 is configured to receive information related to performance of control gestures from gesture module 24, and to determine haptic stimulation to be generated for user 12 associated with the control gestures. The haptic stimulation determined by stimulation module 26 includes haptic stimulation that is responsive to performance of the control gestures separate from the context in which they are performed. For example, in the context of a game haptic stimulation responsive to performance of a control gesture includes haptic stimulation that is not dependent on other variables within the game other than performance of the control gesture.

The haptic stimulation determined by stimulation module 26 is complex and rich beyond the haptic stimulation typically associated with control gestures. For example, in conventional systems, haptic stimulation associated with control gestures tends to include a single stimulation that is provided during and/or after a control gesture. This haptic stimulation provides confirmation of the control gesture. The haptic stimulation determined by stimulation module 26, by contrast, tracks more closely with performance of the control gesture to increase the immersive experience provided by the haptic stimulation.

In one embodiment, the haptic stimulation determined by stimulation module 26 corresponding to a control gesture includes a first stimulation, a second stimulation, and/or other stimulations. The first stimulation is different from the second stimulation. This means that one or more parameters of the first stimulation is different from the second stimulation. The one or more parameters may include one or more of, for example, periodicity, force, directionality, location, and/or other parameters of haptic stimulation. Variation of the one or more parameters between the first stimulation and the second stimulation (and/or other stimulations) may be smooth, and/or may be discrete so as to create a distinct step in the parameter(s) of haptic stimulation between the first stimulation and the second stimulation.

The stimulation module 26 is configured to correlate provision of the first stimulation and the second stimulation with performance of the control gesture to which the first stimulation and the second stimulation correspond. In one embodiment, the first stimulation is determined by stimulation module 26 responsive to performance of the initial portion of the control gesture and the second stimulation is determined by stimulation module 26 responsive to performance of one or more intermediate portions of the control gesture. Responsive to the ending portion of the control gesture, stimulation module 26 may determined another stimulation (e.g., a third stimulation), or may cease the provision of haptic stimulation associated with the control gesture.

In one embodiment, stimulation module 26 determines haptic stimulation associated with a control gesture such that the stimulation is different between intermediate portions of the control gesture. This may result in a smooth changes in the haptic stimulation as performance of the control gesture proceeds, and/or in discrete changes in the haptic stimulation as performance of the control gesture transitions between intermediate portions.

The haptic stimulation determined by stimulation module 26 may be provided to give user 12 some feedback about performance of a control gesture. This may include stimulation that informs user 12 that a portion of the control gesture has begun and/or is currently ongoing, stimulation that prompts user 12 to begin a next portion of the control gesture, and/or stimulation that provides other information about performance of the control gesture to user 12.

In one embodiment stimulation module 26 provides haptic stimulation to user 12 that indicates to user 12 that performance of a control gesture has failed. In this embodiment, responsive to failure by user 12 to perform a portion of a control gesture, or failing to properly transition from one portion of the control gesture to another portion of the control gesture, stimulation module 26 determines a stimulation for provision to user 12 that is indicative of the failure. For example, the failure stimulation may include a fizzle, and/or other stimulation.

Some illustrative examples of control gestures and corresponding haptic stimulation are presented hereafter. The examples given correspond to some classes of game characters commonly found in games that include combat between players and/or between players and non-player characters. Specifically, the examples given below correspond to "casters", "close combat warriors", and "ranged combat warriors." It will be appreciated that these classes of characters are not limiting. Other classes of characters, and/or hybrids included characteristics of a plurality of the classes, may be implemented in accordance with the principles set forth herein.

A "caster" is a character that casts spells (or other similar attacks and/or defenses) during combat. Examples of caster characters include wizards, priests, warlocks, engineers, and/or other characters. To control a caster to cast a given spell, user 12 may be required to perform a control gesture that corresponds to the given spell. As user 12 progresses through the portions of the control gesture, the haptic stimulation determined by stimulation module 26 corresponding to the control gesture may inform user 12 as to the progress of the control gesture. The haptic stimulation associated with the control gesture may further provide information about the power of the spell being cast (e.g., greater the force and/or more rapid periodicity may indicate a more powerful spell).

In one embodiment, as the control gesture proceeds between the portions of the control gesture, the force and/or rapidity of the haptic stimulation determined by stimulation module 26 may increase. This increase may be gradual as the control gesture proceeds and/or in discrete steps (e.g., at transitions between the portions of the control gesture). This is not intended to be limiting, as other parameters of the haptic stimulation may be changed to indicate the progress of the control gesture. The haptic stimulation may provide feedback about the (thus far) successful progress of the control gesture, and/or prompt user 12 with respect to future performance of the control gesture (e.g., to proceed to the next portion, to maintain the current portion, etc.). Upon performing the final portion of the control gesture, stimulation module 26 may determine haptic stimulation that indicates the spell being successfully cast. In one embodiment, user 12 may perform portions of the control gesture that effectively "store" the spell for discharge. This may store the spell for an indefinite period, or for some predetermined maximum storage time. During storage, stimulation module 26 may determine haptic stimulation that confirms the ongoing storage of the spell. If the storage period has a maximum storage time, the haptic stimulation may indicate the status of the storage period with respect to the maximum storage time.

A "close combat warrior" is a character configured to fight enemies at close quarters (e.g., hand-to-hand combat). Such a character may be armed with swinging weapons (e.g., clubs, maces, etc.), stabbing and/or slashing weapons (e.g., knife, axe, sword, etc.), and/or other close quarter weapons. As user 12 controls the character to, for example, wield a blow, stimulation module 26 may determine haptic stimulation that mimics some real-world properties of such attacks. For example, as user 12 strikes into an opponent or object, a first feedback may mimic the striking and/or cutting sensation. As user 12 withdraws a weapon after such a blow, a second feedback may mimic the withdrawal of the weapon from the object or opponent. As another example, as user 12 swings a weapon in a ready position (e.g., swinging a ball on a chain) a first feedback determined by stimulation module 26 may mimic the real world sensation that would be the result of such an activity in real life. Releasing the weapon from the ready position (e.g., striking an opponent or object with the swinging ball) may result in the determination by stimulation module 26 of a second stimulation that mimics the feel of such an attack. The intensity of an attack may be determined based on an amount of time a control gesture (or some portion thereof) is performed, the range of motion of a control gesture, a speed of motion during a control gesture, pressure of the contact between the user and a touch screen included in user interface 14, and/or other parameters of a control gesture (or some portion thereof).

In some implementations, the user interface 14 includes a touch screen in which displays of the content associated with a game is presented by content module 22. In such implementations, the location at which the control gesture is made impacts the manner in which the game is controlled and/or the haptic stimulation determined by stimulation module 26 (for the user inputting the gesture and/or other users). For example, in controlling a close combat warrior, a user may input an attacking control gesture in a manner that indicates a specific portion of an enemy at which the attack should be directed (e.g., a leg, an arm, the head, the torso, etc.). Similarly, in controlling a close combat warrior, a user may input a defense or blocking control gesture in a manner that indicates a specific portion of a character being controlled that should be defended or blocked (e.g., a leg, an arm, the head, the torso, etc.). This location-based aspect of the control gesture may be taken into account in determining the success and/or impact of the corresponding control, and/or in determining the haptic stimulation that corresponds to the control gesture. Multiple attacks may be triggered by touching multiple locations on the touch screen of user interface 14.

A "ranged combat warrior" is a character that is configured and armed for attacking enemies from a range. This may include characters armed, for example, to release projectiles such as arrows, stones, bullets, rockets, and/or other projectiles. By way of non-limiting example, user 12 may control a ranged combat warrior to fire a bow and arrow. In this example, different haptic stimulation may be determined by stimulation module 26 for notching the arrow, drawing the bow (and varying the haptic stimulation to indicate increasing string tension), releasing the string, the bowstring striking the forearm of the character upon release, and/or other portions of the control gesture associated with firing an arrow. The intensity and/or speed of an attack or projectile may be determined based on an amount of time a control gesture (or some portion thereof) is performed, the range of motion of a control gesture, a speed of motion during a control gesture, pressure of the contact between the user and a touch screen included in user interface 14, and/or other parameters of a control gesture (or some portion thereof).

The target at which a ranged attack is directed and/or the path of a projectile emitted as part of a ranged attack may be determined based on a control gesture. For example, if user interface includes a touch screen, the user performing a control gesture may contact a portion of the touch screen on which the target of the ranged attack is displayed (e.g., as part of the control gesture). Similarly, the user may trace on the touch screen a path of a projectile emitted during a ranged attack. The tracing of the path of the projectile may form at least part of the control gesture initiating the attack. The target and/or the path indicated by the control gesture may impact the determination of the corresponding haptic stimulation determined by stimulation module 26.

Game content may include boxes, rooms, gates, vehicles, and/or other objects or items that are "locked", and must be opened through performance of some control gesture. In some implementations, in response to a user selecting such an object or item, stimulation module 26 may determine haptic stimulation indicating to the user that the selected object or item is locked. Performance by the user of a control gesture to unlock the object or item may result in the determination of haptic stimulation by stimulation module 26 corresponding to the control gesture.

In one embodiment, the haptic stimulation determined stimulation module 26 for a given control gesture may vary based on characteristics of a character in a game being controlled by user 12. For example, the haptic stimulation may vary as a function of character skill, character fatigue, character injury, weapon type, weapon disrepair, and/or other characteristics.

Changing the haptic stimulation based on character fatigue and/or injury may be a way of handicapping user 12 as a character that was fatigued or injured would be. This may include altering the force, periodicity, and/or other parameters of the haptic stimulation to inhibit precise control by user 12 (e.g., by increasing the force), to inhibit perception of cues and prompts in the haptic stimulation (e.g., by reducing force, increasing the force of portions of the haptic stimulation that do not provide cues and prompts, reducing response time to cues and/or prompts, etc.), and/or otherwise handicapping user 12.

Varying the haptic stimulation based on character skill may provide a gradual and/or graduated "unlocking" of skills and abilities. For a character with more training and/or skill in a given ability, stimulation module 26 may determine haptic stimulation that provides more clear and/or more easily followed guide to performing a control gesture corresponding to the given ability. For example, as the skill of the character increases, the haptic stimulation determined by stimulation module 26 for the character may provide more definite cues and/or prompts (e.g., see the examples above with respect to character fatigue) that guide user 12 through the control gesture. This enables user 12 to utilize the control gesture without being fully trained in the corresponding ability, but may impact the reproducibility of the control gesture for the user unless further training and/or other skill-building is sought.

Altering the haptic stimulation determined for a control gesture based on the equipment of a character may incentivize maintaining repair of equipment and/or obtaining upgraded equipment without making such activities mandatory. Instead of a digital determination of whether a control gesture is available to user 12, the stimulation module 26 provides haptic stimulation that makes the control gesture easier and/or more enjoyable with "better" virtual equipment.

The equipment module 28 is configured to provide control over virtual equipment for user 12. Within the context of a game being provided to user 12 by system 10, user 12 may control virtual equipment (e.g., directly or through a character that is using the virtual equipment. In such cases, content module 22 provides to user 12, via user interface 14 views of the virtual equipment. The equipment module 28 is configured to determine the operating parameters of the virtual equipment, and to simulate its operation.

In one embodiment in which user interface 14 includes a touch sensitive electronic display, equipment module 28 determines the operating parameters of the virtual equipment and/or simulates operation of the virtual equipment based on selections by user 12 of user selectable sections of the views of the virtual equipment. The user selectable sections of the virtual equipment may be located in the views of the virtual equipment that correspond to sections of the virtual equipment analogous to sections of equipment that would be engaged in real life to configure operating parameters of equipment and/or to operate equipment. The operating parameters of the virtual equipment that are configurable by engaging user selectable sections of the views of the virtual equipment include one or more of an amount of loaded rounds of ammunition, a level of disrepair, a stopping power, a projectile velocity, an ammunition type, a noise level, and/or other operating parameters.

Figure 2:
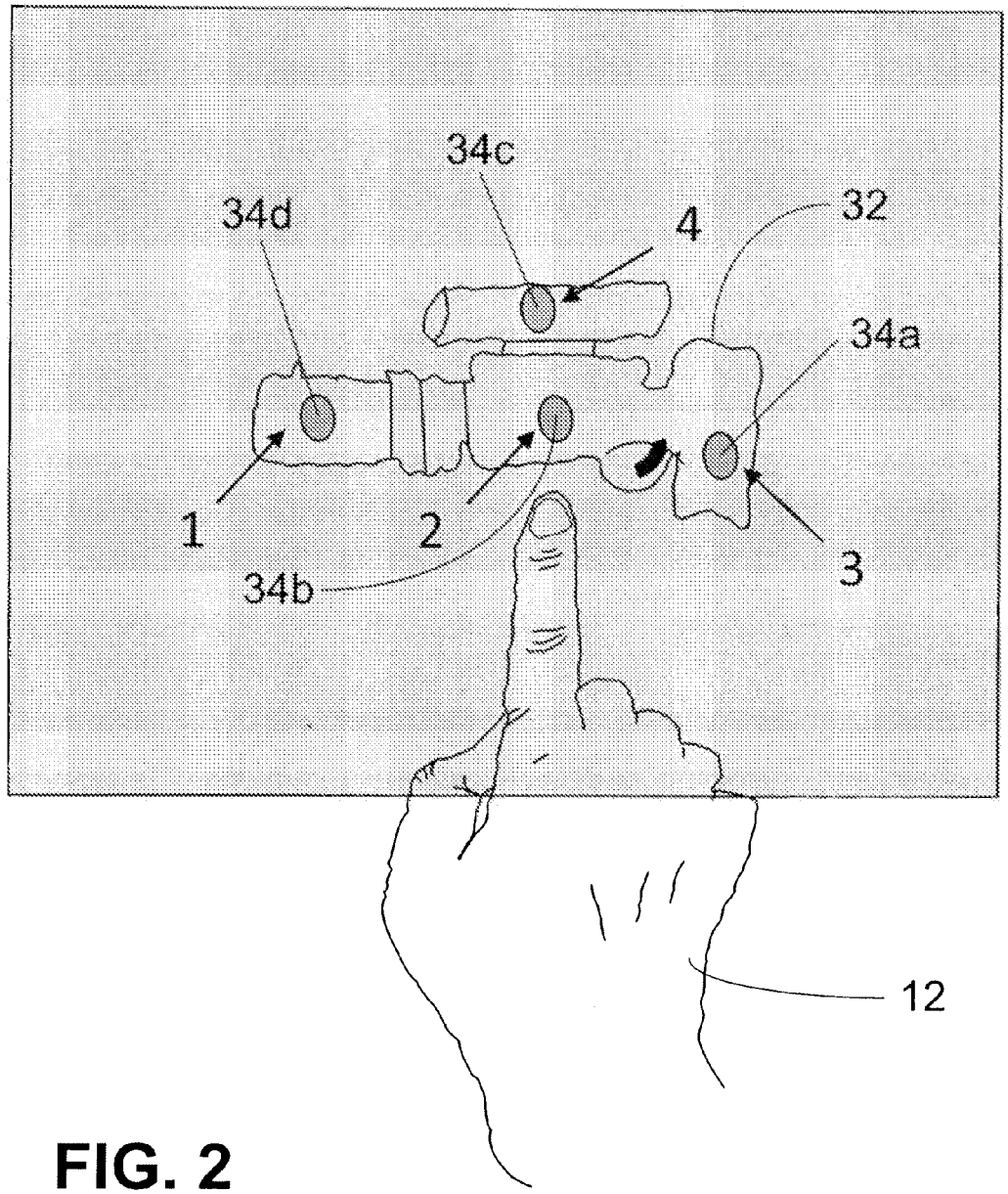
FIG. 2 illustrates a view of a piece of virtual equipment, in accordance with one or more embodiments of the invention.

By way of illustration, FIG. 2 shows a view of a piece of virtual equipment 32 (e.g., a gun). In the view shown in FIG. 2, piece of virtual equipment 32 includes a plurality of selectable sections 34 (illustrated in FIG. 2 as section 34a, section 34b, section 34c, and section 34d). By selecting section 34a, user 12 may configure the handle/stock of piece of virtual equipment 32. By selecting section 34b, user 12 may configure the ammunition of piece of virtual equipment 32. By selecting section 34c, user 12 may configure the sights of piece of virtual equipment 32. By selecting section 34d, user 12 may configure the barrel/muzzle of piece of virtual equipment 32.

Selection of one of selectable sections 34 to configure piece of virtual equipment 32 may include simply selecting the desired selectable section 34, and then selecting a new configuration for the selected section 34. In one embodiment, reconfiguration is made through a touch and drag type of interaction. For example, user 12 may engage an area on user interface 14 that corresponds to ammunition and "drag" the ammunition to section 34b to reload piece of virtual equipment 32. Similarly, user 12 may select and drag a silencer (and/or other muzzle or barrel feature) to section 34d of piece of virtual equipment 32 to change the sound characteristics of piece of virtual equipment 32 (and/or other characteristics).

Figure 3:
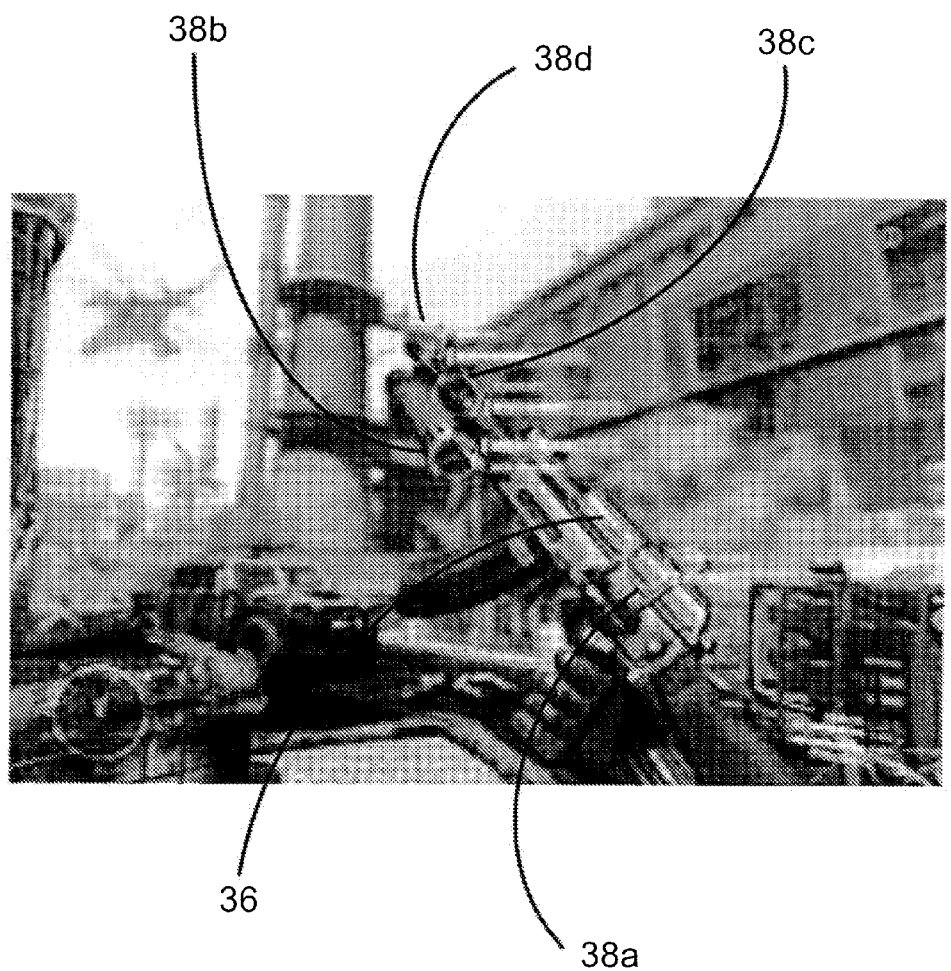
FIG. 3 illustrates a view of a piece of virtual equipment, in accordance with one or more embodiments of the invention.

As another illustrative example, FIG. 3 shows a view of a virtual firearm 36 having a plurality of selectable sections 38 (shown in FIG. 3 as section 38a, section 38b, section 38c, and section 38d). The selectable sections 38 of stimulation module 26 may be selected in a fashion similar to the one discussed above with respect to FIG. 2.

Figure 4:
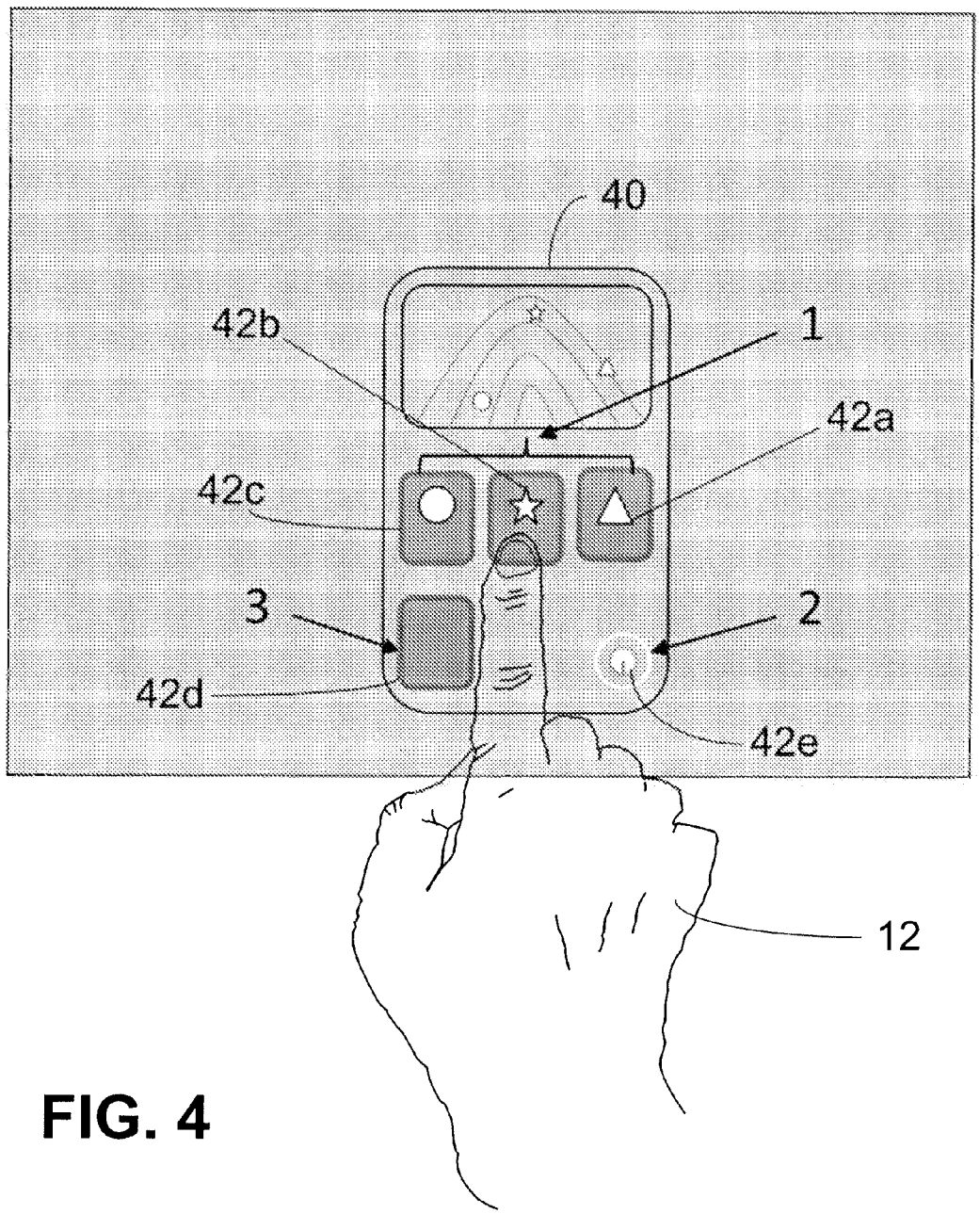
FIG. 4 illustrates a view of a piece of virtual equipment, in accordance with one or more embodiments of the invention.

As yet another illustrative example, FIG. 4 shows a view of a piece of virtual equipment 40 configured to show the proximity of various items to a user (or to a character being controlled by a user) in a game. The piece of virtual equipment 40 includes a plurality of selectable sections 42 (shown in FIG. 4 as section 42a, section 42b, section 42c, section 42d, and section 42e). Individual ones of selectable sections 42 correspond to individual modes of piece of virtual equipment 40 such that selection of one of selectable sections 42 results in piece of virtual equipment 40 operating in accordance with the selected mode. For example, in a first mode piece of virtual equipment 40 may provide an indication of the proximity of other characters, in a second mode piece of virtual equipment 40 may provide an indication of the proximity of enemies, in a third mode piece of virtual equipment 40 may provide an indication of the proximity of one or more resources (e.g., gold, food, ammunition, power-ups, etc.).

Returning now to FIG. 1, in one embodiment, stimulation module 26 is configured to determine haptic stimulation to be generated for the user that is associated with the operating parameters of the virtual equipment and/or the simulated operation of the virtual equipment. This may include, for example, varying the haptic stimulation based on the current operating parameters of a piece of virtual equipment, determining haptic stimulation during the reconfiguration of a piece of virtual equipment to reflect changes being made in the piece of virtual equipment, and/or other aspects of configuration and/or operation of virtual equipment.

By way of non-limiting example, if a virtual firearm is reloaded by user 12, stimulation module 26 determines haptic feedback indicating the reload. The new ammunition is different from previously used ammunition, stimulation module 26 determines haptic feedback upon firing of the firearm that is different from the haptic stimulation determined during firing of the previously used ammunition.

In one embodiment, actuators 16 are configured to actuate the touch sensitive electronic display that presents the views of the virtual equipment to user 12. In this embodiment, delivery of the haptic stimulation determined by stimulation module 26 to user 12 as user 12 engages the touch sensitive electronic display results in a more immersive virtual equipment control experience. For example, as user 12 engages the touch sensitive display to reload a gun, or to switch out a piece of equipment, haptic stimulation is provided to user 12 through the touch sensitive surface that corresponds to the control being exerted over the gun.

The actuator control module 30 is configured to control actuators 16 to generate the haptic stimulus determined by stimulation module 26. This includes communicating the haptic stimulus to be generated from processor 22 to actuators 16. The haptic stimulus to be generated may be communicated over wired communication links, wireless communication links, and/or other communication links between processor 22 and actuators 16.

Figure 5:
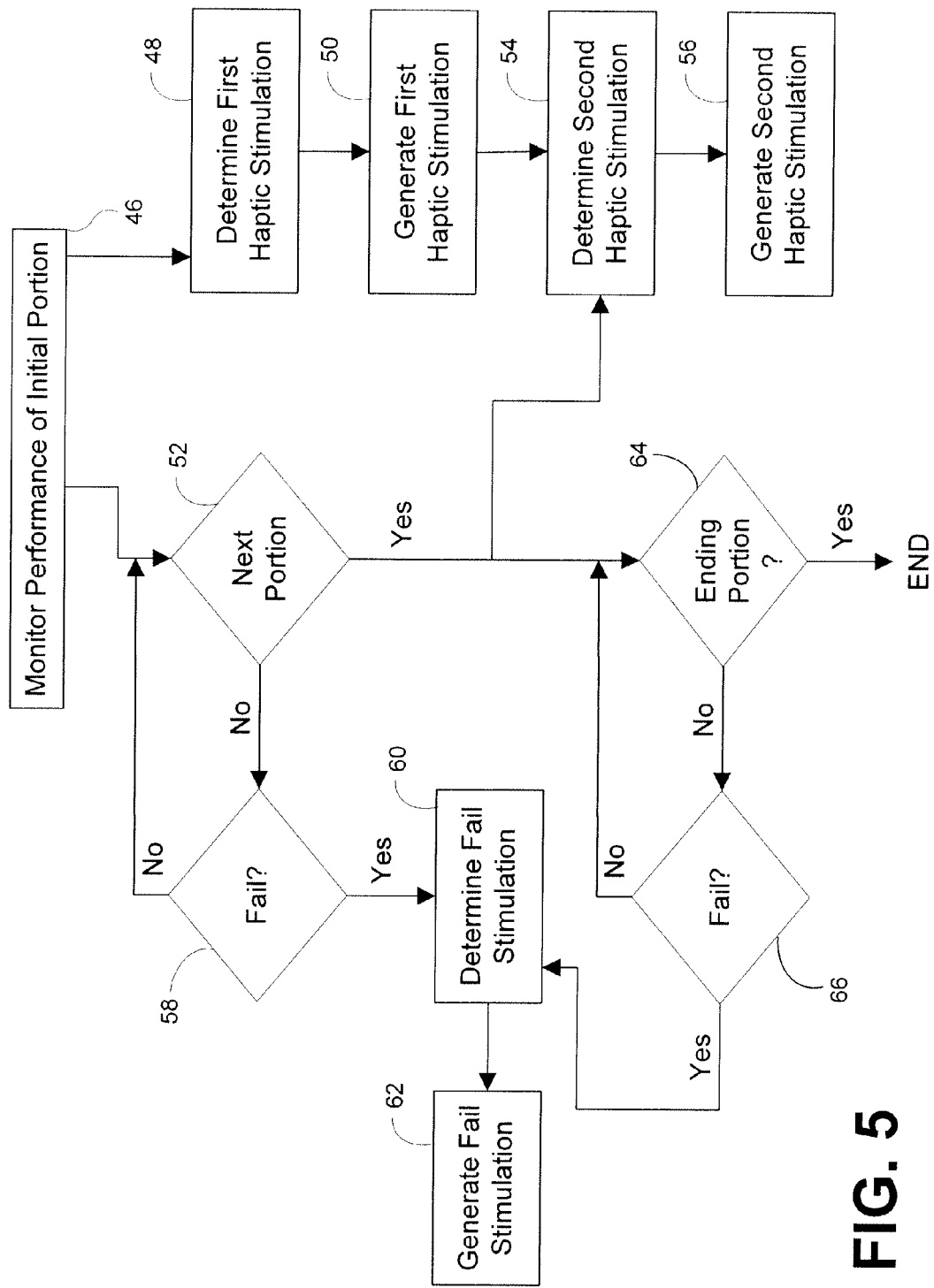
FIG. 5 illustrates a method of providing haptic feedback to a user, according to one or more embodiments of the invention.

FIG. 5 illustrates a method 44 of determining and/or providing haptic stimulation to a user. The haptic stimulation may be determined and/or provided to the user in conjunction with a game, and/or in other contexts. The operations of method 44 presented below are intended to be illustrative. In some embodiments, method 44 may be accomplished with one or more additional operations not described, and/or without one or more of the operations discussed. Additionally, the order in which the operations of method 44 are illustrated in FIG. 5 and described below is not intended to be limiting.

In some embodiments, method 44 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 44 in response to instructions stored electronically on an electronic storage medium. The one or more processing devices may include one or more devices configured through hardware, firmware, and/or software to be specifically designed for execution of one or more of the operations of method 44.

At an operation 46, performance of an initial portion of a control gesture by a user is monitored. Performance of the initial portion of the control gesture may be monitored based on the output signal of a user interface similar to or the same as user interface 14 (shown in FIG. 1 and described above). In one embodiment, operation 46 is performed by a gesture module similar to or the same as gesture module 24 (shown in FIG. 1 and described above).

At an operation 48, responsive to performance of the initial portion of the control gesture, a first haptic stimulation is determined. The first haptic stimulation corresponds to the initial portion of the control gesture. In one embodiment, operation 48 is performed by a stimulation module 26 similar to or the same as stimulation module 26 (shown in FIG. 1 and described above).

At an operation 50, the first haptic stimulation is generated for the user. In one embodiment, operation 50 is performed by one or more actuators similar to or the same as actuators 16 (shown in FIG. 1 and described above).

At an operation 52, a determination is made as to whether a first intermediate portion of the control gesture has been performed by the user. Responsive to the first intermediate portion of the control gesture having been performed, method 44 proceeds to an operation 54. In one embodiment operation 52 is performed by a gesture module similar to or the same as gesture module 24 (shown in FIG. 1 and described above).

At operation 54, a second haptic stimulation is determined. The second haptic stimulation corresponds to the first intermediate portion of the control gesture. In one embodiment, operation 54 is performed by a stimulation module similar to or the same as stimulation module 26 (shown in FIG. 1 and described above).

At an operation 56, the second haptic stimulation is generated for the user. In one embodiment, operation 56 is performed by one or more actuators similar to or the same as actuators 16 (shown in FIG. 1 and described above).

Referring back to operation 52, responsive to the first intermediate portion of the control gesture not having been performed, method 44 proceeds to an operation 58 at which a determination is made as to whether the control gesture has failed. This may be determined based on the output signal of a user interface similar to or the same as user interface 14 (shown in FIG. 1 and described above). The determination of whether the control gesture has failed may be made, for example, based on an amount of time since performance of the initial portion of the control gesture, if actions not included in the control gesture have been performed since performance of the initial portion of the control gesture, and/or other factors. In one embodiment, operation 58 is performed by a gesture module similar to or the same as gesture module 24 (shown in FIG. 1 and described above).

Responsive to a determination at operation 58 that the control gesture has not failed, method 44 returns to operation 52. Responsive to a determination at operation 58 that the control gesture has failed, method 44 proceeds to an operation 60. At operation 60, haptic stimulation is determined that indicates failure of the control gesture. In one embodiment, operation 60 is performed by a stimulation module similar to or the same as stimulation module 26 (shown in FIG. 1 and described above).

Upon determination of the haptic stimulation at operation 60, the determined haptic stimulation is generated for the user at operation 62. In one embodiment, operation 62 is performed by one or more actuators similar to or the same as actuators 16 (shown in FIG. 1 and described above).

Referring back to operation 52, further responsive to determination that the first intermediate portion of the control gesture has been performed, method 44 proceeds to an operation 64. At operation 64, a determination is made as to whether an ending portion of the control gesture has been performed. Responsive to a determination that the control gesture has ended, method 44 ends the provision of haptic stimulation associated with the control gesture. In one embodiment, a final haptic stimulation associated with the completion of the control gesture is further determined and generated. In one embodiment, operation 64 is performed by a gesture module similar to or the same as gesture module 24 (shown in FIG. 1 and described above).

Responsive to a determination at operation 64 that the ending portion of the control gesture has not yet been performed, method 44 proceeds to an operation 66. At operation 66, a determination is made as to whether the control gesture has failed. This may be determined based on the output signal of a user interface similar to or the same as user interface 14 (shown in FIG. 1 and described above). The determination of whether the control gesture has failed may be made, for example, based on an amount of time since performance of the first intermediate portion of the control gesture, if actions not included in the control gesture have been performed since performance of the first intermediate portion of the control gesture, and/or other factors. In one embodiment, operation 66 is performed by a gesture module similar to or the same as gesture module 24 (shown in FIG. 1 and described above).

Responsive to a determination at operation 66 that the control gesture has not failed, method 44 returns to operation 64. Responsive to a determination at operation 66 that the control gesture has failed, method 44 proceeds to operations 60 and 62.

In one embodiment, the control gesture includes more than one intermediate portion. In this embodiment, method 44 is expanded between operations 52 and 64 to monitor the additional intermediate portion(s) and generate corresponding haptic stimulation in a manner similar to that shown and described for the first intermediate portion.

Figure 6:
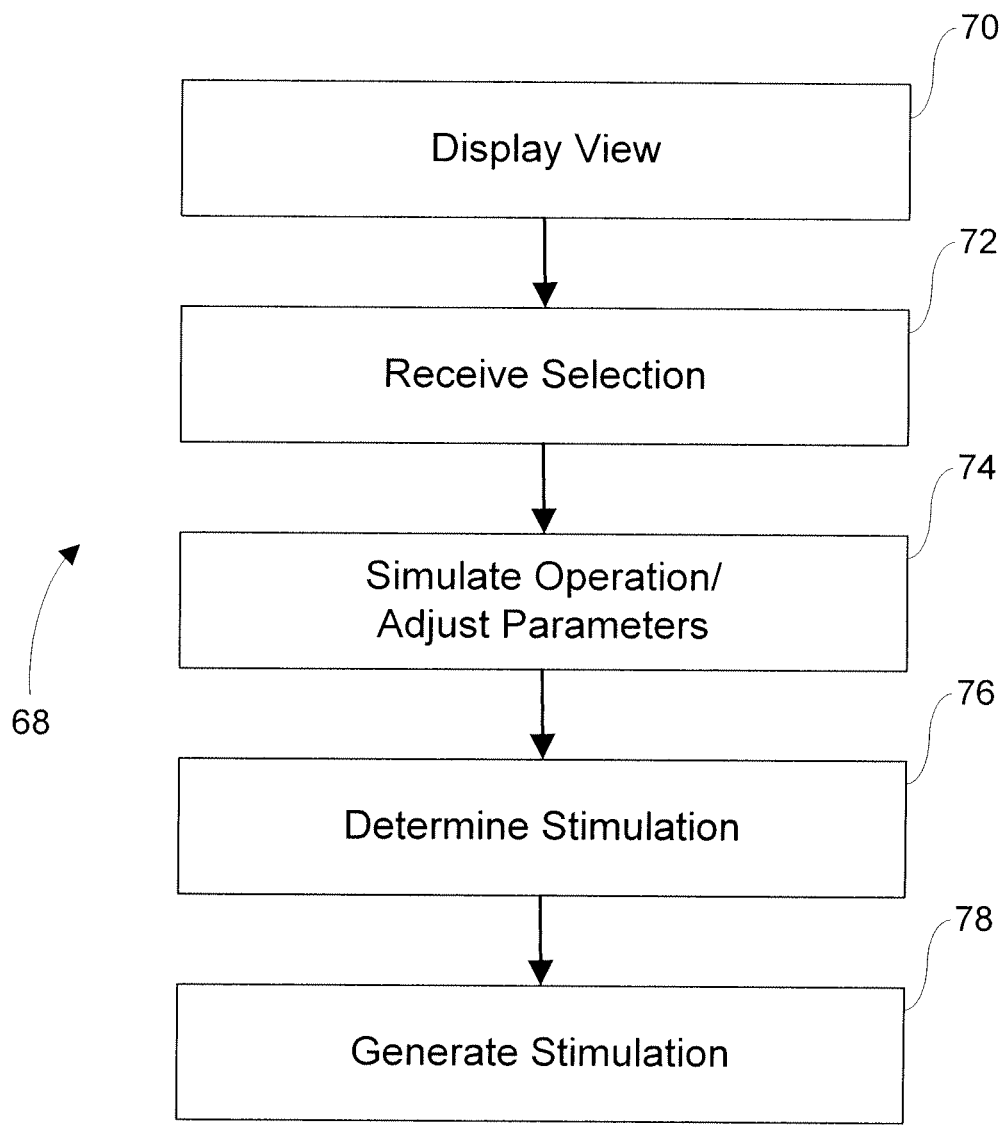
FIG. 6 illustrates a method of providing haptic feedback to a user, according to one or more embodiments of the invention.

FIG. 6 illustrates a method 68 of determining and/or providing haptic stimulation to a user. The haptic stimulation may be determined and/or provided to the user in conjunction with a game, and/or in other contexts. The operations of method 68 presented below are intended to be illustrative. In some embodiments, method 68 may be accomplished with one or more additional operations not described, and/or without one or more of the operations discussed. Additionally, the order in which the operations of method 68 are illustrated in FIG. 6 and described below is not intended to be limiting.

In some embodiments, method 68 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 68 in response to instructions stored electronically on an electronic storage medium. The one or more processing devices may include one or more devices configured through hardware, firmware, and/or software to be specifically designed for execution of one or more of the operations of method 68.

At an operation 70, a view of virtual equipment is presented to the user via a touch sensitive electronic display. The view includes selectable sections that are selectable by the user to interact with the virtual equipment shown in the view. In one embodiment, the view of the virtual equipment is determined by a content module similar to or the same content module 22 (shown in FIG. 1 and described above).

At an operation 72, selection of one of the selectable sections of the view of the virtual equipment is received. The selection may be received through the touch sensitive electronic display through which the view is presented.

At an operation 74, operation of the virtual equipment is simulated and/or one or more parameters of the virtual equipment is adjusted based on the selection received at operation 72. In one embodiment, operation 74 is performed by an equipment module similar to or the same as equipment module 28 (shown in FIG. 1 and described above).

At an operation 76, haptic stimulation associated with the operation of the virtual equipment and/or the adjustment of the operating parameters of the virtual equipment effected at operation 74 is determined. In one embodiment, operation 76 is performed by a stimulation module similar to or the same as stimulation module 26 (shown in FIG. 1 and described above).

At an operation 78, the haptic stimulation determined at operation 76 is generated for the user. In one embodiment, operation 78 is performed by one or more actuators similar to or the same as actuators 16 (shown in FIG. 1 and described above).

As was mentioned above, the description of complex haptic stimulation in response to gesture-based control for a single user is not intended to be limiting. Haptic stimulation generated in response to gesture-based control in a multi-user environment is also contemplated. The haptic stimulation provided to a given user may include haptic feedback that is responsive to gesture-based controls of another user and/or other phenomena.

Figure 7:
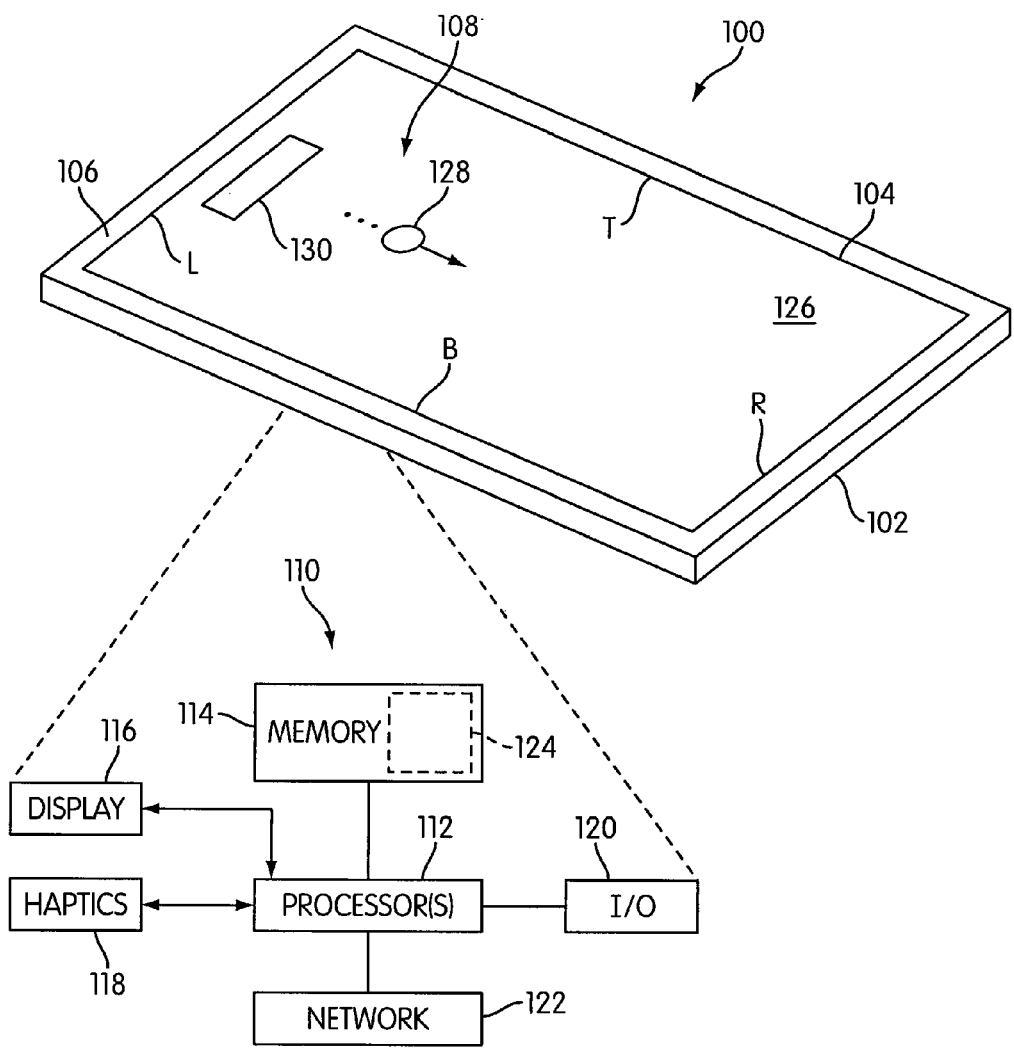
FIG. 7 illustrates a portable computing device, in accordance with one or more embodiments of the invention.

FIG. 7 is a diagram illustrating an example 100 of a portable computing device configured in accordance with one or more aspects of the present invention. Particularly, a tablet computer 102 is shown. Tablet computer 102 includes a screen 104 mounted to a body 106, with the top surface 108 representing a surface with which a user interacts. In this example, top surface 108 is bordered by body 106, but the screen area could extend all the way to the edges of the tablet. Tablet computer 102 can use any number or type of touch-sensing technologies to determine when a user has touched on or near surface 106. For example, surface 108 may include a resistance or capacitance-based touch sensing system and/or an optical touch sensing system.

Although a tablet computer is shown in this example, it can be understood that any touch-enabled computing device can be used. For instance, a smaller device such as a cellular telephone or media player may feature a touch-enabled display and can provide haptic outputs in accordance with the present subject matter. As another example, a haptically-enabled display surface associated with and interfaced to another computing device (e.g., a desktop or server computer) can be used. For example, surface 108 may represent a larger touch-enabled surface such as a table upon which a screen image is projected from above or below. A flat surface is depicted here, although the present subject matter could be applied for use in devices with curved surface and/or non-smooth surfaces. Gestures input to the computer (or other computing device) via touch may be control gestures. It will be appreciated that the description of gestures involving touch are not intended to limit the scope of control gestures discussed herein. Control gestures may include (with or without touch gestures) manipulation of a component or body (e.g., "tilt" controls), manipulation of one or more stick controls, manipulation of one or more buttons, manipulation of one or more switches, and/or manipulation of or interaction with other interface features.

FIG. 7 illustrates an example of the architecture of a computing device 102 at 110. Computing device 102 comprises one or more processors 112 configured to execute computer program modules, a memory 114 such as RAM, ROM, or other memory technology, a display interface 116, a haptic interface 118, I/O interface 120, and network interface 122. Any suitable display technology can be used. In some embodiments, an LCD display is used.

Haptic interface 118 can comprise suitable components for driving one or more actuators used to play back haptic effects so as to provide a physical sensation to a user of device 102. For example, some or all of display 104 may include embedded actuators so that targeted physical output can be provided to a portion of the display to provide a physical effect where the user touches surface 108. Additional actuators may be used to provide haptic output via other surfaces of tablet 102, such as its sides and the surface opposite surface 108 (i.e., the back of the device). It will be appreciated that the location of the actuator relative to the desired physical effect can vary. For example, in order to produce an effect at a first part of the screen, an actuator at a second part of the screen (or elsewhere in the device) may be driven so that the properties of intervening components of the screen and/or device influence what is felt at the first part of the screen.

In one embodiment, the tablet comprises an actuator having an eccentric rotating mass motor. The actuator is coupled either directly or indirectly to a surface of the tablet housing. Powering the motor causes vibration on the surface that a user can feel. By varying the magnitude and freq of the signal sent to the actuator, various effects are possible. As another example, an actuator may be used to raiser or lower sections of the screen to create ridges, troughs, or other features. As a further example, an actuator can comprise a piezoelectric. For example, a piezoelectric actuator can be embedded, at least partially, in an inorganic polymer matrix, such as silicone. As yet a further example, an actuator may comprise a macro-fiber composite actuator or piezocomposite actuator. Such actuators may be formed as a thin layer of piezoelectric fibers suspended in a matrix (e.g., epoxy). The fibers may communicate electrically with polyimide electrodes. Many other types of actuators may be used, and so this exemplary description of actuators is not meant to be limiting.

I/O interface 120 can be used by processor(s) 112 to receive input and provide output using any suitable components. For example, I/O interface 120 may link to speakers and/or a microphone for receiving voice input and providing audio output. As another example, I/O interface 120 may provide a connection to peripheral devices such as a mouse or stylus used to provide input to the device, or to an imaging sensor used to capture still images and/or video.

Network interface 122 can be used to link device 102 to a network using one or more networking technologies. For instance interface 122 may provide a connection to suitable components for connecting to an IEEE 802.11 (Wi-Fi) or 802.16 (Wimax) network, or a connection using Bluetooth technology. As another example, interface 122 may allow communication via a telephone, Ethernet, or other wired connection or may support other wireless technology such as communication via an IR port.

Computing device 102 can comprise additional components—for example, one or more storage components (e.g., magnetic or solid-state hard disk drives) can be included. If computing device 102 comprises a cellular telephone, appropriate RF components may be included as well.

Memory 114 tangibly embodies one or more program components that configure computing device 102 to operate in an intended manner. For example, memory 114 can include one or more applications, an operating system, and can also include stored data. As illustrated, memory 114 also includes a program component 124 for providing an interactive game in accordance with one or more aspects noted below.

Generally, the game can configure computing device 102 to present a play area 126 via display 104, track the movement of a virtual object 128 (e.g., a ball) in the play area, and respond to user interactions to launch and deflect the virtual object during play using paddle 130. Additionally, the game can be configured to play back haptic effects as the virtual object moves through and encounters features of the play area. The haptic effects can be selected to provide a sensation that differs based on the particular features that are encountered. In this example, play area includes a top T, bottom B, left side L, and right side R. The game can be configured so that the virtual object is deflected by paddle 130 prior to reaching left side L. If multiple players are involved, the virtual object may exit at one or more sides T, B, or R and pass to another user's screen as noted below.

Figure 8A:
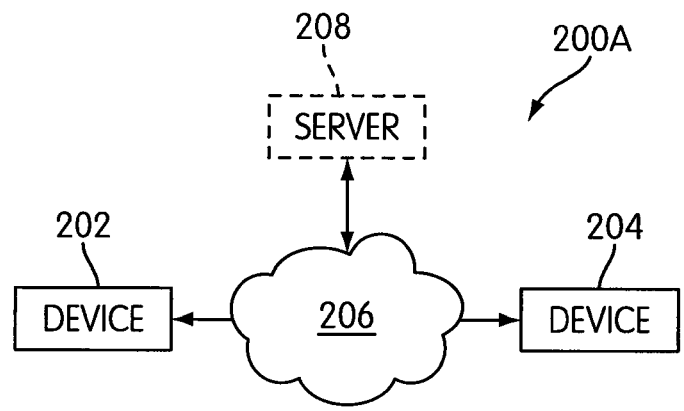
FIG. 8A illustrates an example of the use of a game to support multi-user play, according to one or more embodiments of the invention.

FIG. 8A illustrates an example 200A of the use of a game to support multi-user play. The game program can support sending and receiving data to facilitate tracking the position of the virtual object in a play area that comprises multiple screens. In this example a first device 202 is interfaced to a second device 204 via a network 206. Network 206 may comprise a local area network, a wide area network, or may represent a direct connection between devices 202 and 204. By interfacing multiple devices running an instance of the game, a user can experience haptic effects when the virtual object encounters features in another user's screen. Such haptic effects may include haptic effects determined in accordance with a control gesture input on another user's screen.

For example, if the play area 126 of FIG. 7 is used, then when virtual object 128 exits at right side R of a first device it may enter the screen at right side R of the second device. As another example, the devices may have mirror-image layouts; that is, device 202 may feature paddle 130 along left side L while device 204 includes paddle 130 along right side R. In that case, when the virtual object reaches right side R of the play area of the first device, it may enter the play area at left side L of the other device, headed towards right side R and paddle 130 in the play area of the other device.

Server 208 is depicted to illustrate that in some embodiments, multi-user play may be facilitated by a server. However, as noted above, in some embodiments game program is configured to directly interface with other instances without need of a server.

Figure 8B:
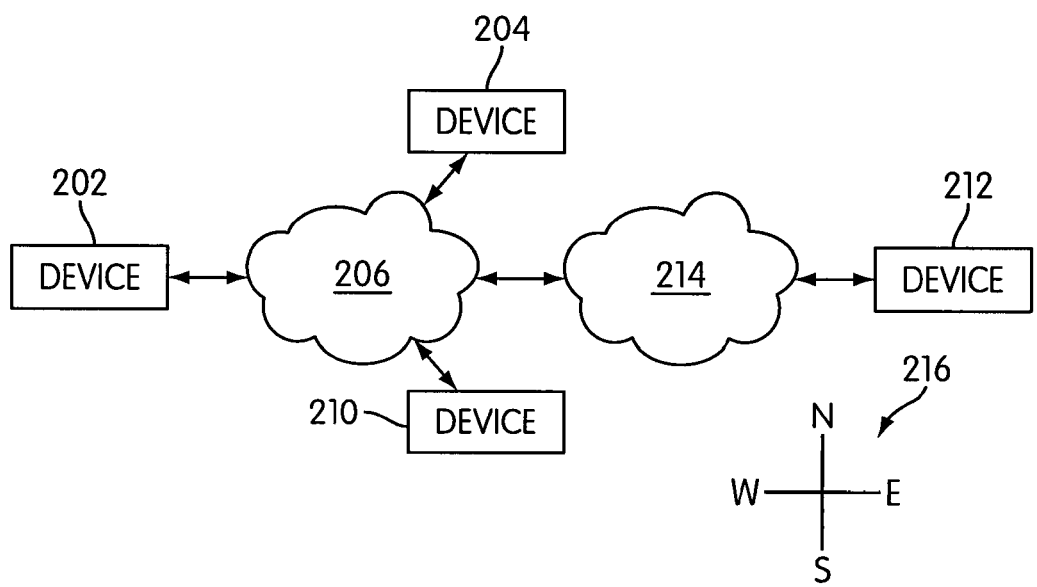
FIG. 8B illustrates an example of the use of a game to support multi-user play, according to one or more embodiments of the invention.

FIG. 8B illustrates another example 200B of a multi-user play. In this example, three devices 202, 204, and 210 are interfaced via a first network 206. A second network 214 facilitates interaction with a fourth device 212. For example, network 206 may comprise a local area network connection while network 214 may comprise a wide-area network connection. Compass 216 is illustrated to show that in some embodiments the relative position of multiple players can be considered. For example, as the "westmost" player, device 202 may include paddle 130 at left side L. Device 204 may have its paddle positioned along top side T, since device 204 is "northmost." Device 210 may have its paddle positioned along bottom side B, while device 212 may have its paddle positioned along right side R. Alternatively, the paddle may remain on the same side of the screen for each user but with appropriate mapping between edges to maintain the relative position of the users around the shared play area.

It will be understood that in various embodiments the game can be configured to dynamically adjust the behavior and connections between the play areas based on factors such as each device's orientation, the relative position of the players, and other considerations such as the relative size of screen areas. As will be noted below, the virtual object can move from one screen to another in other manners in addition to or instead of encountering the boundaries of the play area.

Figure 9:
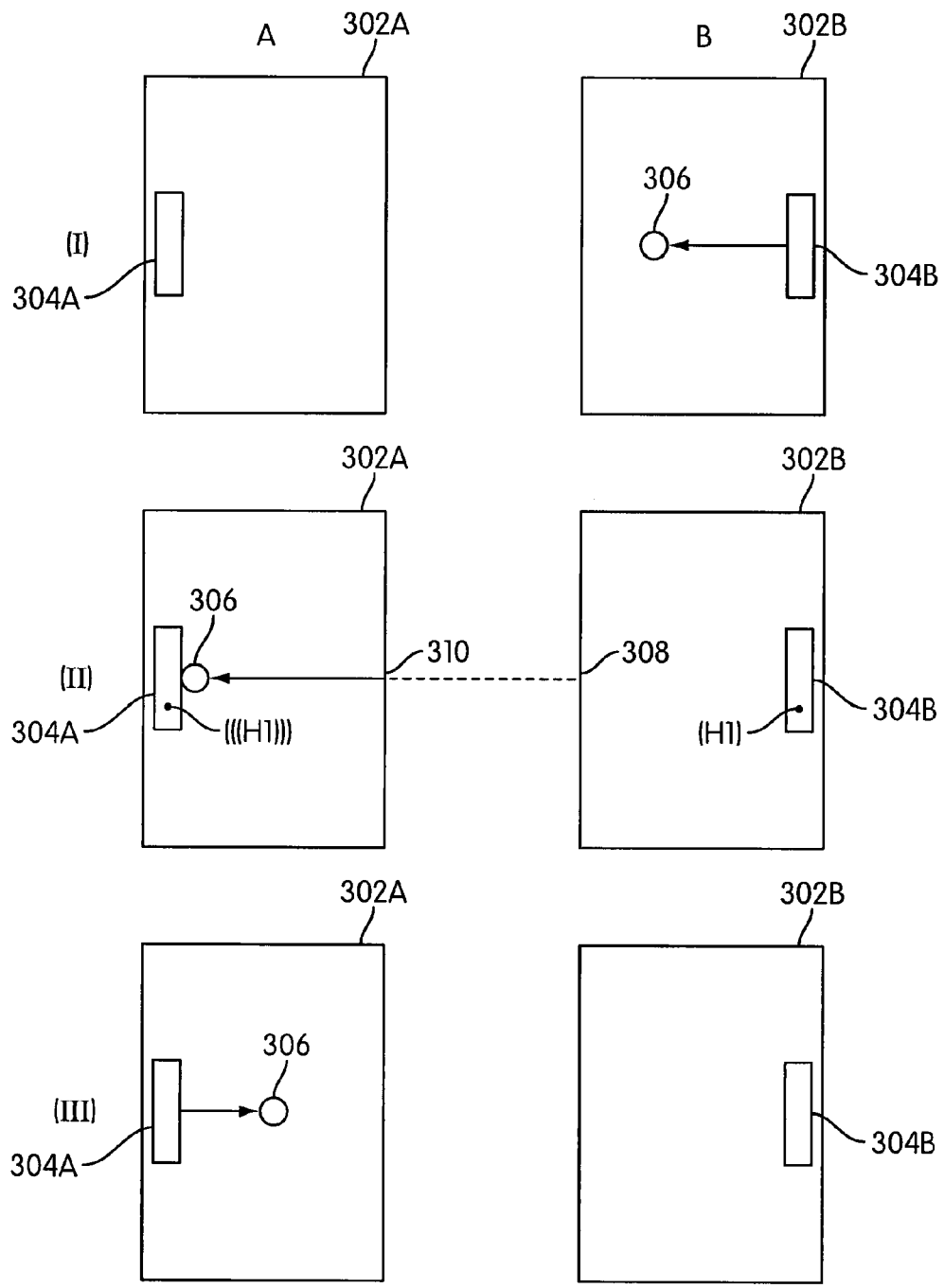
FIG. 9 illustrates an example of play areas for two respective users over a plurality of time intervals, in accordance with one or more embodiments of the invention.

FIG. 9 illustrates an example of play areas 302A and 302B for two respective users A and B over a plurality of time intervals (I), (II), and (III). Each play area 302 includes a respective paddle 304. At time interval (I), virtual object 306 has been launched or deflected from paddle 304B towards the boundary of play area 302B. As shown at time interval (II), exit point 308 from play area 302B is mapped to an entry point 310 in play area 302A. The mapping may allow the virtual object to pass instantly between the play areas or there may be a delay based on the distance between the players (e.g., as determined by GPS and/or other triangulation or proximity detection techniques). In any event, time interval (II) depicts virtual object 306 encountering paddle 304A. For example, user A may have moved paddle 304A by sliding his or her fingers along the display surface of his device to intercept virtual object 306.

When virtual object 306 encounters paddle 304A, a haptic effect H1 is selected and played back. As illustrated, haptic effect H1 is localized to the point at which user A touches paddle 304A (and/or another part of play area 302). As was noted above, the sensation can be generated by commanding one or more actuators to provide motion or another effect; the actuators may be located at the point at which the effect is intended to be felt and/or elsewhere. FIG. 9 shows effect H1 as "(((H1)))" in play area 302A and as "(H1)" in play area 302B since the effect is also played back for player B and localized to player B's touch point. However, as indicated the intensity of effect H1 differs as between players A and B.

The haptic effect can be selected based on the simulated physics of the game. For example, the paddles 304 may represent a hard surface, and so effect H1 may comprise a strong, sharp effect. Since a deflection is meant to represent a "hit," effect H1 may be the strongest effect in the game. The "hit" is played back to user B to alert user B that the virtual object will be returned and user B can prepare to deflect the incoming virtual object. The hit may be played back to player B with a suitable indicator of direction—for instance, the effect may be designed to feel like it originated from the left, rather than the top or bottom; this may be helpful when three of more users are playing together.

By playing back the haptic effect even for a collision (or other event) occurring in a different player's screen, the game can enhance the perception that the players are sharing a space even though the players cannot view one another's play areas. Thus, the players may become more immersed in the game and may have a more compelling game experience.

Figure 10:
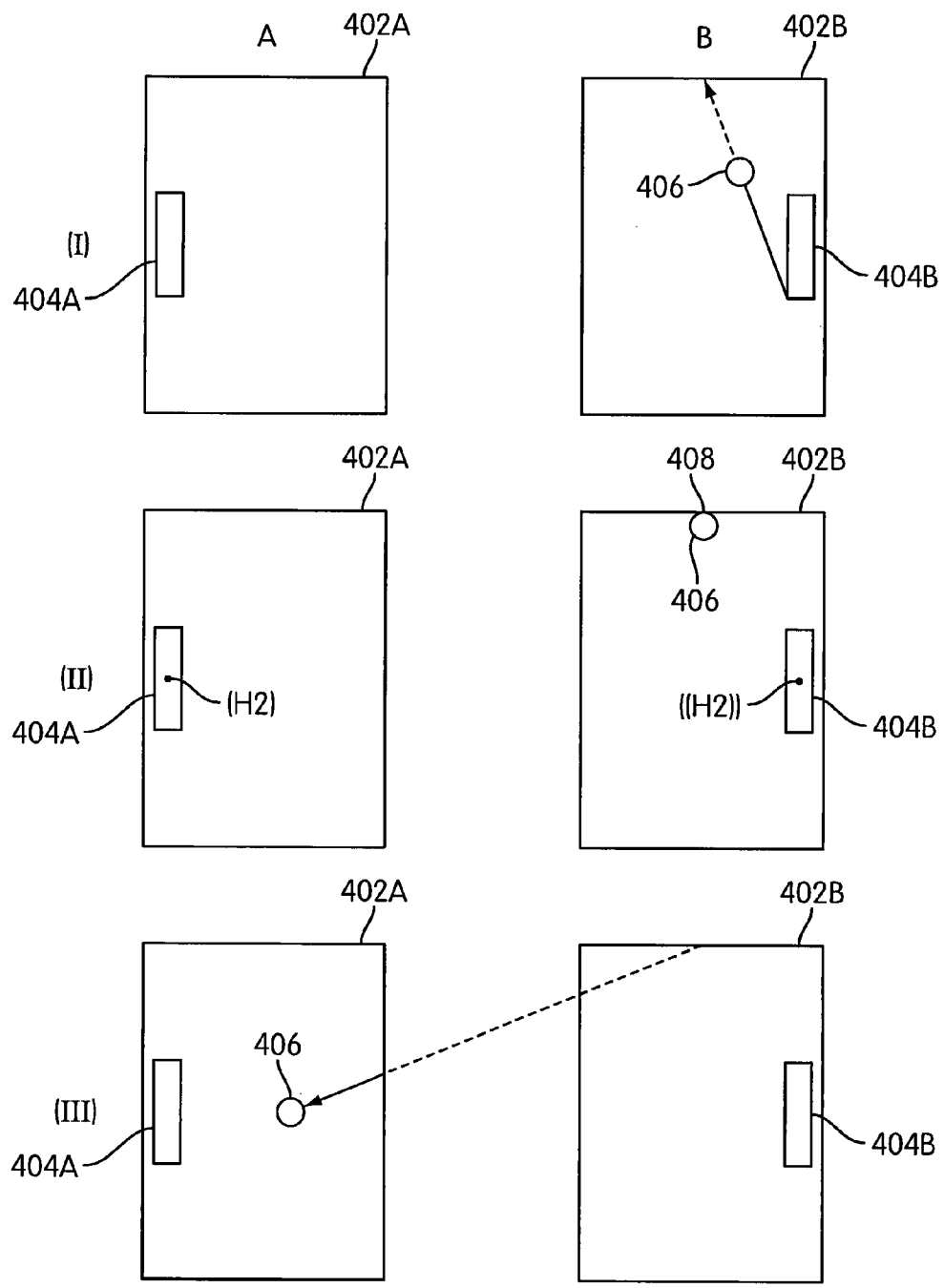
FIG. 10 illustrates an example of play and depicts the virtual object ricocheting off the border of a play area, according to one or more embodiments of the invention.

FIG. 10 illustrates another example of play and depicts the virtual object ricocheting off the border of a play area. Particularly, three time intervals (I), (II), and (III) are again shown. Play areas 402A and 402B correspond to players A and B, while paddles 404 and virtual object 406 are also illustrated. As shown at time interval (I), virtual object 406 is launched with a trajectory towards a point 408 at the top boundary of play area 402. Interval (II) illustrates when virtual object 406 encounters point 408. A "bounce" haptic effect H2 is played back to players A and B, localized to their touch points at respective paddles 404A and 404B.

Since the "bounce" occurs in play area 402B and is at a closer distance to paddle 404B than paddle 404A, it is depicted as "((H2))" in play area 402B and "(H2)" in play area 402A since the bounce is "louder" for player B. As shown at time interval (III), after the bounce the virtual object passes to play area 402A. Alerted to the bounce, player A may attempt to intercept the virtual object and prevent it from reaching the goal area behind paddle 404A.

Figure 11:
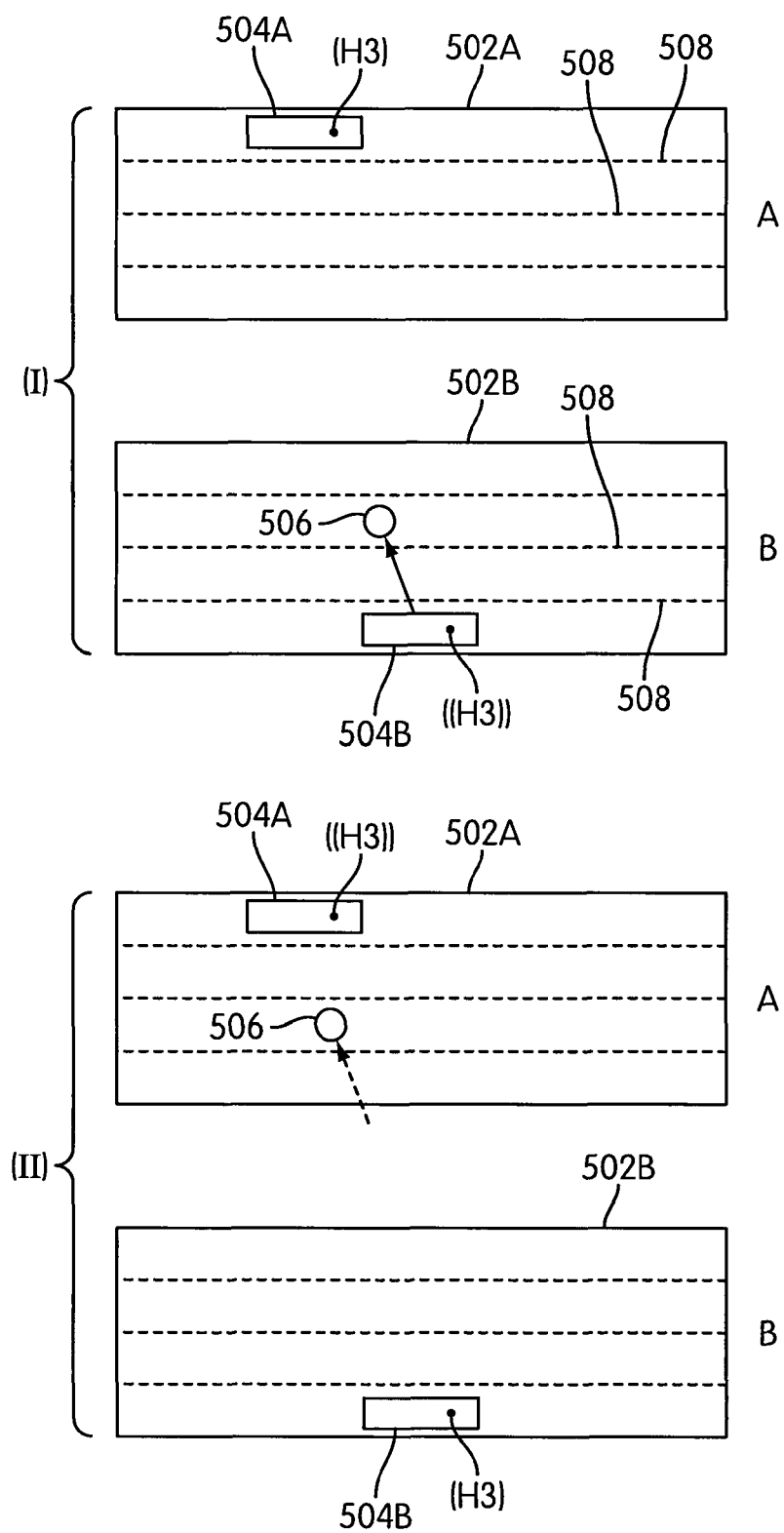
FIG. 11 illustrate a use of haptic effects to simulate a continuous effect, in accordance with one or more embodiments of the invention.

FIG. 11 is a diagram illustrating another aspect of the present subject matter. In addition to or instead of haptic effects played in response to events changing the virtual object trajectory or other "discrete" events, haptic effects can be played back to simulate a continuous effect. In this example, play areas 502 for two players A and B are shown in a time interval (I) and a time interval (II). For purposes of illustration, play areas 502 are shown in a "landscape," rather than "portrait" orientation. Each play area features a respective paddle 504 as well, and virtual object 506 is depicted.

Each play area of this example also includes seams 508 represented by dotted lines. For example, seams 508 may represent boundaries between planks in a wooden surface depicted in the play area. To simulate a wood panel background, a continuous low rumble effect to correlate with the virtual object rolling across the surface can be combined with click effects to correlate with the virtual object encountering seams 508. This effect is shown as "H3" in FIG. 11. At time interval (I), the effect is shown as "((H3))" for players B and "(H3)" for player A since the virtual object is closer to paddle 504B than paddle 504A. At time interval (II), effect H3 is louder for paddle 504A since virtual object 506 is moving towards player A. Although the background effect is shown in conjunction with seams 508, a background effect could be included to simulate a surface alone (i.e. a continuous surface) or could vary as the simulated background surface changes (e.g., from a wood area to a metal area to a concrete area, etc.).

Figure 12:
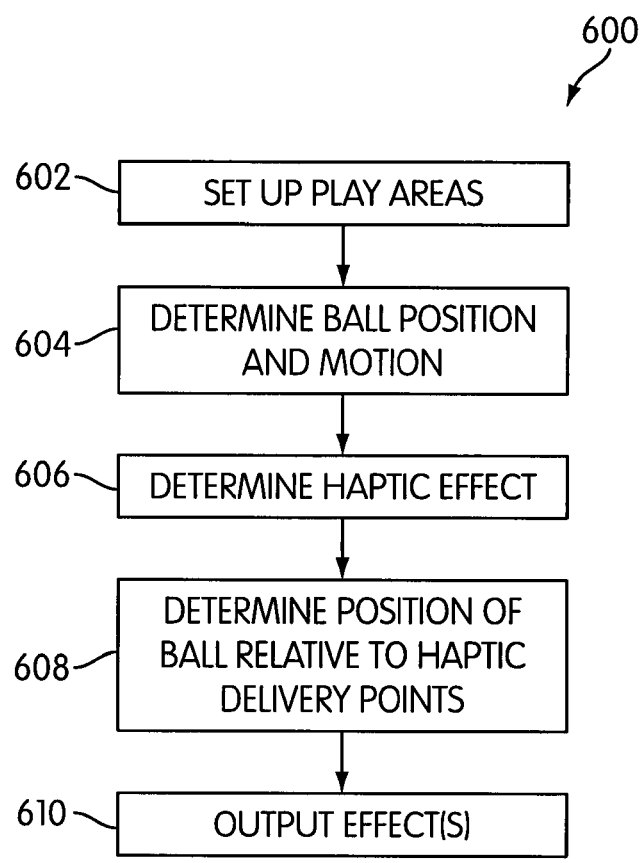
FIG. 12 illustrates a method for providing a game, according to one or more embodiments of the invention.

FIG. 12 is a flowchart illustrating illustrative steps in a method 600 for providing a game in accordance with the present subject matter. Block 602 represents setting up one or more play areas. For example, if two users desire to play, respective play areas can be initialized and mappings between the shared boundaries (and/or other entry-exit points) can be determined.

Block 604 occurs while play continues. At least one instance of the game can track the position and motion of the virtual object based on interaction with paddles, obstacles, and characteristics of the play area based on a model simulating physics of the game. For example, the model can provide for changes in the virtual object's speed and direction based on simulating momentum, mass, and material characteristics of the virtual object and the other items in the play area.

At block 606, based on the position and motion of the virtual object at, before, and/or after an event, one or more haptic effects to play back can be determined. For example, if the virtual object encounters a boundary or other object in the play area, a haptic effect associated with the physical interaction between the virtual object and boundary/object can be selected for playback. Different boundaries/objects may result in different effects. For example, a border or paddle may result in a "hard" effect, while obstacles included in the play area may have "soft" effects. Simulated properties of the virtual object can be taken into account as well—the game may support a mode with a hard (e.g., steel) virtual object or a soft (e.g., rubber) virtual object with appropriate changes in the haptic output scheme.

Additionally or alternatively the haptic effect can relate to a background effect. For instance, as was noted above, a continuous haptic effect simulating passage of the virtual object over a simulated surface can be provided based on characteristics of that surface. As another example, the surface may include material or an obstacle for the virtual object to pass through and a suitable haptic effect can be provided to simulate passage through the material/obstacle.

At block 608, the game determines the position of the virtual object relative to the haptic delivery point(s) to adjust how the haptic effect is to be output. For instance, a haptic delivery point can include the point at which a user touches the screen of a device. The "loudness" (i.e., intensity) of the haptic effect can be inversely proportional to the distance between the delivery point and the virtual object. Directionality may also be applied. For example, if a ricochet occurs on another screen, the haptic effect that is presented may include a directional component or may be otherwise be presented to give an indication of where the ricochet occurred.

At block 610, suitable signals are sent to the actuators to generate the haptic effect(s) having the desired volume. For example, the game can consult a library of signal patterns for use in generating different haptic effects and use the signal patterns to command one or more actuators embedded in the screen and/or other portions of the device. The haptic effects may include sounds and/or visual elements as well.

For multi-user play, each respective instance of the game can determine the virtual object's position and motion while in that instance's play area and pass that information to the other instances. When the virtual object exits the play area, information regarding the virtual object's motion (e.g., a vector with direction and speed) can be used to continue tracking by the instance of the game whose play area is to receive the virtual object.

In some embodiments, when an event occurs and/or when background effects are provided, the haptic effect is selected by the instance of the game whose play area contains the virtual object when the haptic effect is to be triggered and that information is provided to the other instances of the game. For example, in a game involving player A and player B, if the virtual object collides with an obstacle, border, or paddle in player A's play area, the instance of the game on player A's device can provide player B's device the desired haptic effect along with information about the collision and position thereof for use by the instance of the game on player B's device in determining a volume or directionality for the effect.

Figure 13:
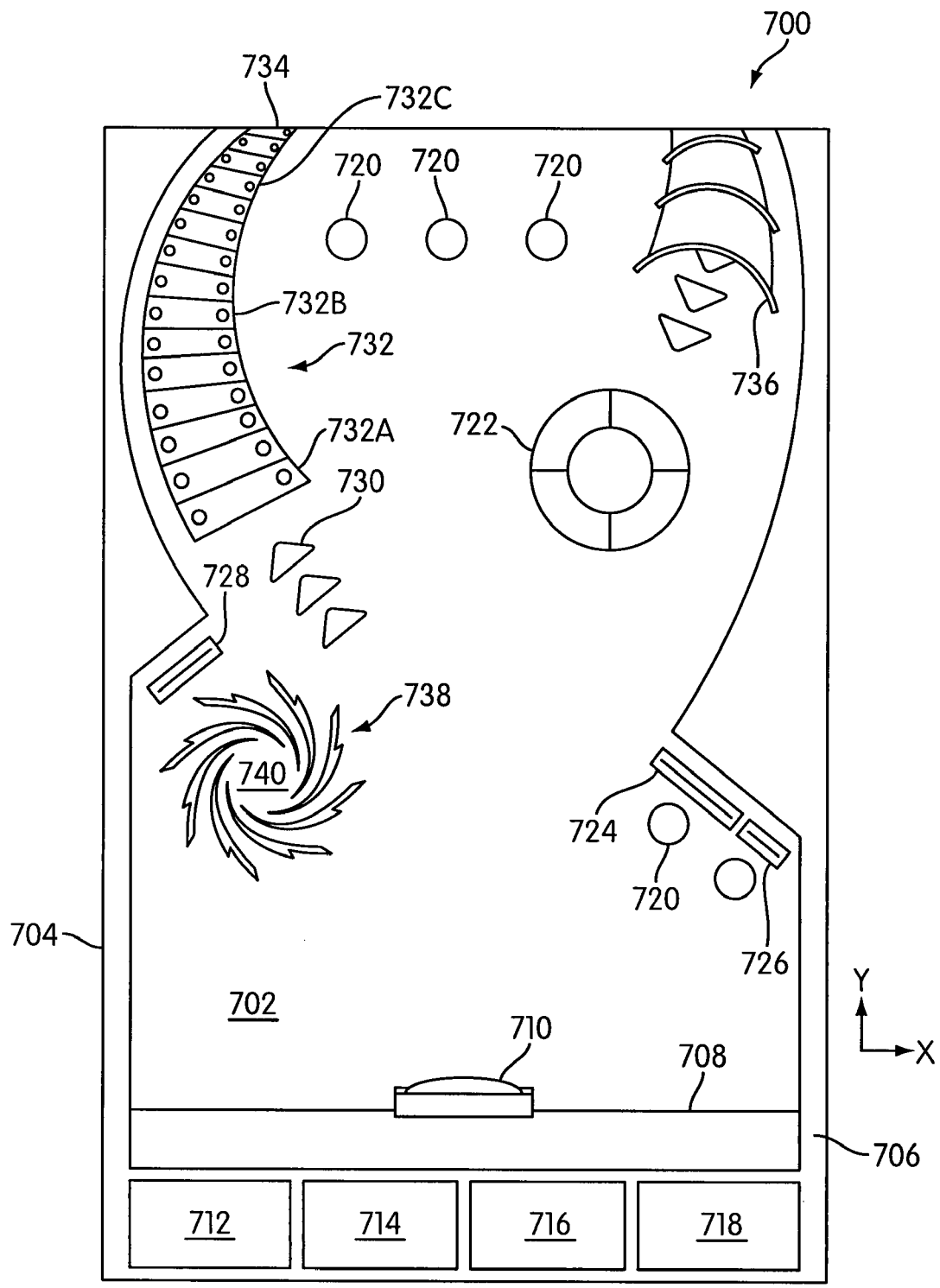
FIG. 13 illustrates an example of an interface for an instance of a game, in accordance with one or more embodiments of the invention.

FIG. 13 is a diagram illustrating an example of an interface 700 for an instance of a game configured in accordance with aspects of the present subject matter. In this example, a pinball-like game is presented in which the play area 702 includes a border 704, 706 that extends inward from the screen boundaries. The objective of the game is to prevent a virtual object (not shown), such as a ball or other object, from reaching 708 by deflecting the virtual object using paddle 710. To begin play, the virtual object may be launched from paddle 710 or may appear elsewhere in play area 702.

Interface 700 includes a plurality of control buttons 712, 714, 716, and 718 which may be used to provide inputs and access menus. For example, buttons 712 and 714 may comprise play and pause buttons, while button 716 provides a "launch" command and button 718 exits the game or launches a menu for configuring, saving, or exiting the game. In some embodiments, control buttons 712-718 may be provided with suitable haptic effects to simulate pushing a physical button.

Turning to play area 702, a plurality of simulated lights 720 can be provided to enhance the visual experience; the lights may or may not act as obstacles. A bumper 722 may cause the virtual object to "bounce" in response to a collision in a manner different from a ricochet from border 704, 706. For example, border 704, 706 may be presented as a simulated metal border which causes a sharp ricochet effect. Bumper 722 may feature an initial amount of "give" before imparting force on the virtual object in a manner similar to that of a pinball machine bumper. Accordingly, when the virtual object encounters border 704, 706 or bumper 722, different respective haptic effects may be played back at the point(s) at which the user contacts the screen to provide different sensations in accordance with the simulated physical response of the borders/bumper. Additionally, as was noted above, the intensity of the effect can depend on distance from the point(s) at which the user contacts the screen.

This example features metal bars 724, 726, and 728, which may provide a still further response to collisions with a virtual object and may be assigned their own respective haptic effect. Arrows 730 may comprise a visual effect and/or may result in an acceleration of the virtual object into xylophone structure 732. In this example, xylophone structure 732 comprises a plurality of keys (732A, 732B, 732C identified), with each ascending key having its own associated haptic effect. For example, as the virtual object moves from key 732A to 732B to 732C, the haptic effect may increase in pitch along with corresponding xylophone sound effects. At the same time, the haptic effect may decrease in intensity as the virtual object moves away.

In some embodiments, point 734 represents an exit from the play area and into a second user's play area, which is identical to play area 702. When the virtual object enters play area 702, it may be returned via chute 736 along with an accompanying "rattle" representing passage through the chute. As was noted above, each haptic effect in one user's play area can also be played back in the other user's (or users') play area(s) but with a corresponding decrease in intensity based on the separation from the site of the event causing the haptic effect and the user's point of contact with the screen.

Some embodiments feature one or more instances of a vortex as shown at 738. Vortex 738 can comprise a portion of play area 702 that attracts the virtual object toward opening 740. If the virtual object reaches opening 740, the virtual object may pass into another play area. When the virtual object initially contacts vortex 738, a first haptic effect representing the "pull" of the vortex may be played back, with the effect becoming stronger until (and if) the virtual object reaches opening 740. At that point, an "exit" effect may be played back to represent the virtual object's exit from the vortex in another play area. This can, for instance, alert the user of the play area receiving the virtual object to move his or her paddle 710 into position.

In some embodiments, if the virtual object is not deflected from goal area 708, a haptic effect representing entry of area 708 is presented, such as absorption of the virtual object or an explosion. At that point, depending upon the rules of the game, the virtual object may be provided for launch again via paddle 710 for another round. In some embodiments, the game proceeds until one player reaches a predetermined score level (e.g., 7 goals) and/or score differential (ahead by 3 goals). As another example, point values may be associated with hitting certain obstacles (e.g., bumper 722, bars 724, 726, 728, lights 720) or passing through all keys of xylophone structure 732. Embodiments may support moving or destroying obstacles (e.g., breaking through bricks) during the course of play, with suitable haptic effects provided based on motion or destruction of the obstacles.

In some embodiments, a computing device may be sensitive to distance of a user's fingers or stylus from the touch screen and/or touch pressure. These features may be used during play of the game and/or in configuring the game application. For instance, if the device indicates that the user is not touching the screen or another haptically-enabled area, haptic effects can be turned off to reduce power consumption. As another example, the user may be able to hover to provide input. For instance, the area at which buttons 712-716 are presented may ordinarily appear as brushed metal, but the buttons may appear in response to a user hovering or touching the area.

In several examples above, game play proceeded based on movement of a paddle using touch. Additionally or alternatively, gameplay may depend on tilt sensors and/or accelerometers. For example, users may be able to tilt or swing their devices to affect the movement of the virtual object and/or paddle position. Haptic effects can be delivered at the point(s) at which the users grip their respective devices. In some embodiments, the game may use multiple paddles per user or may use no paddles at all, with all input based on tilt/acceleration.

Several examples of multi-user play were provided. In some embodiments, single-user play is also supported. For example, a play area may be completely closed, with the virtual object returning towards the paddle and goal area. As another example, single user play may proceed with one or more other players simulated, with the other players having a respective simulated play area and with corresponding haptic feedback when the virtual object enters the simulated play area.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide haptic stimulation to a user, the system comprising:
 a user interface configured to generate output signals related to the gestures of a user;
 a haptic device configured to generate haptic stimulation to the user; and
 one or more processors configured to execute computer program modules, the computer program modules comprising:
  a gesture module configured to monitor performance of a control gesture by the user based on the output signals of the user interface,
  wherein the control gesture is a gesture associated with a command input to the system, and includes an initial portion, a first intermediate portion, and an ending portion;
  a stimulation module configured to receive information related to performance of the control gesture from the gesture module, and to determine haptic stimulation to be generated for the user associated with the control gesture,
  wherein the haptic stimulation includes a first stimulation determined responsive to performance of the initial portion of the control gesture, and a second stimulation that is different from the first stimulation and is determined responsive to performance of the first intermediate portion of the control gesture; and
  a control module configured to control the haptic device to generate the stimulation determined by the stimulation module.

2. The system of claim 1, wherein the stimulation module is configured such that the haptic stimulation associated with the control gesture includes a third stimulation different from the first stimulation and the second stimulation that is determined responsive to performance of the ending portion of the control gesture.

3. The system of claim 1, wherein the control gesture further includes a second intermediate portion, and wherein the stimulation module is configured such that the haptic stimulation associated with the control gesture includes a third stimulation different from the first stimulation and the second stimulation that is determined responsive to performance of the second intermediate portion of the control gesture.

4. The system of claim 3, wherein the second stimulation is determined to signal to the user that the second intermediate portion of the control gesture should be commenced.

5. The system of claim 1, wherein the command input associated with the control gesture is a single, discrete command.

6. The system of claim 1, wherein the second stimulation is determined by adjusting one or more parameters of the first stimulation.

7. The system of claim 6, wherein the one or more parameters of the first stimulation that are adjusted to determine the second stimulation include one or more of periodicity, force, directionality, or location.

8. The system of claim 1, wherein the first intermediate portion of the control gesture includes maintaining contact with a touch sensitive surface for a predetermined period of time.

9. The system of claim 1, wherein the gesture module is configured to identify a control gesture failure responsive to the users commencing performance of the control gesture and not successfully performing all of the portions of the control gesture, and wherein the stimulation module is configured such that the haptic stimulation associated with the control gesture includes a third stimulation different from the first stimulation and the second stimulation that is determined responsive to identification of a control gesture failure by the gesture module.

10. The system of claim 1, wherein the stimulation module is configured such that the first stimulation and/or the second stimulation are determined in part based on one or more of a skill-level, fatigue, or injury of a character in a game under the control of the user.

11. A computer-implemented method of providing haptic stimulation to a user of a system, the method being implemented in the system which includes a haptic device and one or more physical processors configured to execute computer program modules, the method comprising:
   monitoring, on the one or more processors, performance of a control gesture by a user,
   wherein the control gesture is a gesture associated with a command input to the system, and includes an initial portion, a first intermediate portion, and an ending portion;
   determining, on the one or more processors, haptic stimulation associated with performance of the control gesture to be generated for the user,
   wherein the haptic stimulation includes a first stimulation determined responsive
   to performance of the initial portion of the control gesture, and a second stimulation that is different from the first stimulation and is determined responsive to performance of the first intermediate portion of the control gesture; and
   generating, with the haptic device, the determined stimulation during performance of the control gesture.

12. The method of claim 11, wherein the haptic stimulation associated with the control gesture includes a third stimulation different from the first stimulation and the second stimulation that is determined responsive to performance of the ending portion of the control gesture.

13. The method of claim 11, wherein the control gesture further includes a second intermediate portion, and wherein the haptic stimulation associated with the control gesture further includes a third stimulation different from the first stimulation and the second stimulation that is determined responsive to performance of the second intermediate portion of the control gesture.

14. The method of claim 13, wherein the second stimulation is determined by the one or more processors to signal to the user that the second intermediate portion of the control gesture should be commenced.

15. The method of claim 11, wherein the command input associated with the control gesture is a single, discrete command.

16. The method of claim 11, wherein the second stimulation is determined by the one or more processors by adjusting one or more parameters of the first stimulation.

17. The method of claim 16, wherein the one or more parameters of the first stimulation that are adjusted to determine the second stimulation include one or more of periodicity, force, directionality, or location.

18. The method of claim 11, wherein the first intermediate portion of the control gesture includes maintaining contact with an interface surface of a touch sensitive surface for a predetermined period of time.

19. The method of claim 11, wherein responsive to identification of a control gesture failure during monitoring of performance of the control gesture the haptic stimulation associated with the control gesture includes a third stimulation different from the first stimulation and the second stimulation.

20. The method of claim 11, wherein the first stimulation and/or the second stimulation are determined by the one or more processors in part based on one or more of a skill-level, fatigue, or injury of a character in a game under the control of the user.

21. A system configured to provide stimulation to a user of a game, the system comprising:
   a touch sensitive electronic display having an interface surface accessible for engagement by the user, the touch sensitive user interface being configured to generate output signals related to the position at which the interface surface is engaged, and to present views of the game to the user through the interface surface,
   wherein the views presented through the interface surface include views of virtual equipment having user selectable sections that are selectable by the user to interact with the virtual equipment by engaging the interface surface at the user selectable sections of the views of the virtual equipment;
   a haptic device configured to generate haptic stimulation to the user; and
   one or more processors in operative communication with the touch sensitive electronic display and the haptic device, the one or more processors being configured to execute computer program modules, the computer program modules comprising:

an equipment module configured to determine the operating parameters of the virtual equipment in the views, and to simulate operation of the virtual equipment, wherein the equipment module determines the operating parameters of the virtual equipment and/or simulates operation of the virtual equipment based on selections by the user of the user selectable sections of the views of the virtual equipment;

a stimulation module configured to determine haptic stimulation to be generated for the user associated with the operating parameters of the virtual equipment and/or simulated operation of the virtual equipment, a control module configured to control the haptic device to generate the stimulation determined by the stimulation module.

22. The system of claim 21, wherein the virtual equipment includes a projectile weapon.

23. The system of claim 22, wherein the operating parameters of the virtual equipment based on selections by the user of the user selectable sections of the views of the virtual equipment include one or more of an amount of loaded rounds of ammunition, a level of disrepair, a stopping power, a projectile velocity, an ammunition type, or a noise level.

24. The system of claim 21, wherein the haptic device is configured to actuate the touch sensitive electronic display.

25. The system of claim 21, wherein the haptic device is configured to actuate the interface surface.

26. The system of claim 21, wherein the operating parameters of the virtual equipment include activation and deactivation of individual pieces of virtual equipment.

27. The system of claim 21, wherein the user selectable sections of the views of the virtual equipment correspond to sections of the virtual equipment analogous to sections of equipment that would be engaged in real life to configure operating parameters and/or operate the equipment.

28. The system of claim 21, wherein the equipment module is configured to add or remove one or more components of a piece of virtual equipment based on the user engaging user selectable sections of a view of the piece of virtual equipment.

29. The system of claim 28, wherein the removal and/or addition of one or more components of the piece of virtual equipment are reflected in the views of virtual equipment presented to the user through the interface surface.

30. The system of claim 21, wherein equipment module is configured to change equipment modes of a piece of virtual equipment based on the user engaging user selectable section of a view of the piece of virtual equipment.

31. A computer-implemented method of providing stimulation to a user of a game, the method being implemented in a system including a haptic device, a touch sensitive electronic display, and one or more physical processors configured to execute computer program modules, the method comprising:

presenting views of a game through an interface surface of the touch sensitive electronic display that is accessible for engagement by a user, wherein the views presented through the interface surface include views of virtual equipment having user selectable sections that are selectable by the user to interact with the virtual equipment by engaging the interface surface at the user selectable sections of the views of the virtual equipment;

receiving selection of one of the user selectable sections via an by the user engagement of the selected user selectable section on the interface surface;

determining, on the one or more processors, the operating parameters of the virtual equipment in the views and/or simulating operation of the virtual equipment based on the received selection;

determining on the one or more processors, responsive to the received selection, haptic stimulation to be generated for the user associated with the operating parameters of the virtual equipment and/or simulated operation of the virtual equipment; and generating the determined haptic stimulation with the haptic device.

32. The method of claim 31, wherein the virtual equipment includes a projectile weapon.

33. The method of claim 32, wherein the operating parameters of the virtual equipment determined based on selection of the selected user selectable section include one or more of an amount of loaded rounds of ammunition, a level of disrepair, a stopping power, a projectile velocity, an ammunition type, or a noise level.

34. The method of claim 31, wherein the haptic stimulation is generated to actuate the touch sensitive electronic display.

35. The method of claim 31, wherein the haptic stimulation is generated to actuate the interface surface.

36. The method of claim 31, wherein the operating parameters of the virtual equipment determined based on selection of the selected user selectable section include activation and deactivation of individual pieces of virtual equipment.

37. The method of claim 31, wherein the user selectable sections of the views of the virtual equipment correspond to sections of the virtual equipment analogous to sections of equipment that would be engaged in real life to configure operating parameters and/or operate the equipment.

38. The method of claim 31, further comprising adding or removing one or more components of a piece of virtual equipment based on the user engaging user selectable sections of a view of the piece of virtual equipment.

39. The method of claim 38, wherein the removal and/or addition of one or more components of the piece of virtual equipment are reflected in the views of virtual equipment presented to the user through the interface surface.

40. The method of claim 31, further comprising changing equipment modes of a piece of virtual equipment based on the user engaging user selectable section of a view of the piece of virtual equipment.

* * * * *